US008659619B2

(12) United States Patent  (10) Patent No.: US 8,659,619 B2
Cannon et al.  (45) Date of Patent: Feb. 25, 2014

(54) DISPLAY DEVICE AND METHOD FOR DETERMINING AN AREA OF IMPORTANCE IN AN ORIGINAL IMAGE

(75) Inventors: James W. Cannon, Penfield, NY (US); Steven M. Belz, Pittsford, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 235 days.

(21) Appl. No.: 10/810,283

(22) Filed: Mar. 26, 2004

(65) Prior Publication Data

US 2005/0212817 A1  Sep. 29, 2005

(51) Int. Cl.
*G09G 5/00* (2006.01)

(52) U.S. Cl.
USPC ........... 345/619; 345/625; 382/168; 382/171; 382/255

(58) Field of Classification Search
USPC ......... 345/423, 619, 620, 621, 622, 623, 624, 345/625, 628, 642, 671, 660, 661; 382/173, 382/190, 195, 199, 200, 203, 218, 209, 168, 382/255, 171
See application file for complete search history.

(56) References Cited

U.S. PATENT DOCUMENTS

| | | |
|---|---|---|
| 3,971,065 A | 7/1976 | Bayer |
| 4,603,966 A | 8/1986 | Brownstein |
| 4,642,678 A | 2/1987 | Cok |
| 4,685,143 A | 8/1987 | Choate |
| 4,955,064 A | 9/1990 | Shirasaka et al. |
| 4,969,202 A | 11/1990 | Groezinger |
| 5,001,507 A | 3/1991 | Iida et al. |
| 5,016,107 A | 5/1991 | Sasson et al. |
| 5,081,689 A | 1/1992 | Meyer et al. |
| 5,103,254 A | 4/1992 | Bell et al. |
| 5,142,380 A | 8/1992 | Sakagami et al. |
| 5,150,143 A | 9/1992 | Ohno et al. |
| 5,164,831 A | 11/1992 | Kuchta et al. |
| 5,172,234 A | 12/1992 | Arita et al. |
| 5,227,824 A | 7/1993 | Yoshida et al. |

(Continued)

FOREIGN PATENT DOCUMENTS

| | | |
|---|---|---|
| JP | 2001/116985 | 10/1999 |
| JP | 2004-072655 | 3/2004 |

(Continued)

OTHER PUBLICATIONS

Olympus Inc., "Digital Camera D-360L Instruction Manual", 2000, pp. 78-79.

(Continued)

*Primary Examiner* — Michelle L Sams

(57) ABSTRACT

Display devices and methods for operating a display device are provided. A display device has a source of an original image and a display. A user input system is adapted to generate a non-directional signal in response to a user input action. A controller is provided and is adapted to detect the non-directional signal and to successively designate a different one of a set of portions of the original image in response to each non-directional signal. The controller is further adapted to cause the display to present a portion evaluation image showing the currently designated portion of the original image and to determine and area of importance in the original image based upon the currently designated portion. At least one of the portions of the set of portions of the original image is non-central with respect to the original image.

30 Claims, 10 Drawing Sheets

(56) References Cited

U.S. PATENT DOCUMENTS

| | | | |
|---|---|---|---|
| 5,266,985 A | 11/1993 | Takagi | |
| 5,361,119 A | 11/1994 | Shida et al. | |
| 5,373,322 A | 12/1994 | Laroche et al. | |
| 5,389,988 A | 2/1995 | Daitoku | |
| 5,404,189 A | 4/1995 | Labaziewicz et al. | |
| 5,440,369 A | 8/1995 | Tabata et al. | |
| 5,444,798 A | 8/1995 | Enomoto et al. | |
| 5,446,804 A | 8/1995 | Allebach et al. | |
| 5,455,654 A | 10/1995 | Suzuki | |
| 5,477,264 A | 12/1995 | Sarbadhikari et al. | |
| 5,486,893 A | 1/1996 | Takagi | |
| 5,496,106 A | 3/1996 | Anderson | |
| 5,548,327 A | 8/1996 | Gunday et al. | |
| 5,557,328 A | 9/1996 | Ishihama et al. | |
| 5,557,358 A | 9/1996 | Mukai et al. | |
| 5,563,655 A | 10/1996 | Lathrop | |
| 5,563,718 A | 10/1996 | Wober et al. | |
| 5,583,593 A | 12/1996 | Terada | |
| 5,619,265 A | 4/1997 | Suzuki et al. | |
| 5,619,738 A | 4/1997 | Petruchik et al. | |
| 5,634,040 A | 5/1997 | Her et al. | |
| 5,647,025 A * | 7/1997 | Frost et al. | 382/255 |
| 5,663,759 A | 9/1997 | Horng et al. | |
| 5,666,215 A | 9/1997 | Fredlund et al. | |
| 5,666,566 A | 9/1997 | Gu et al. | |
| 5,668,597 A | 9/1997 | Parulski et al. | |
| 5,672,840 A * | 9/1997 | Sage et al. | 89/41.01 |
| 5,675,358 A | 10/1997 | Bullock et al. | |
| 5,675,400 A | 10/1997 | Stephenson, III | |
| 5,697,001 A | 12/1997 | Ring et al. | |
| 5,706,049 A * | 1/1998 | Moghadam et al. | 348/333.03 |
| 5,710,954 A | 1/1998 | Inoue | |
| 5,715,334 A * | 2/1998 | Peters | 382/254 |
| 5,715,483 A | 2/1998 | Omata et al. | |
| 5,734,425 A | 3/1998 | Takizawa et al. | |
| 5,740,479 A | 4/1998 | Soma et al. | |
| 5,742,233 A | 4/1998 | Hoffman et al. | |
| 5,743,609 A | 4/1998 | Bauer et al. | |
| 5,754,230 A | 5/1998 | Tsuruta | |
| 5,760,917 A | 6/1998 | Sheridan | |
| 5,765,045 A | 6/1998 | Takagi et al. | |
| 5,784,658 A | 7/1998 | Hata et al. | |
| 5,796,428 A | 8/1998 | Matsumoto et al. | |
| 5,822,625 A | 10/1998 | Leidig et al. | |
| 5,828,406 A | 10/1998 | Parulski et al. | |
| 5,845,166 A | 12/1998 | Fellegara et al. | |
| 5,874,994 A | 2/1999 | Xie et al. | |
| 5,877,772 A * | 3/1999 | Nomura et al. | 345/594 |
| 5,877,809 A * | 3/1999 | Omata et al. | 348/345 |
| 5,892,991 A | 4/1999 | Hamada et al. | |
| 5,897,232 A | 4/1999 | Stephenson et al. | |
| 5,898,779 A * | 4/1999 | Squilla et al. | 713/176 |
| 5,909,598 A | 6/1999 | Kadohara | |
| 5,926,218 A | 7/1999 | Smith | |
| 5,930,539 A | 7/1999 | Tanaka | |
| 5,933,137 A | 8/1999 | Anderson | |
| 5,940,121 A | 8/1999 | Mcintyre et al. | |
| 5,943,050 A | 8/1999 | Bullock et al. | |
| 5,966,553 A | 10/1999 | Nishitani et al. | |
| 5,973,734 A | 10/1999 | Anderson | |
| 5,978,016 A | 11/1999 | Lourette et al. | |
| 6,004,061 A | 12/1999 | Manico et al. | |
| 6,005,613 A | 12/1999 | Endsley et al. | |
| 6,018,362 A | 1/2000 | Suzuki et al. | |
| 6,018,397 A | 1/2000 | Cloutier et al. | |
| 6,020,920 A | 2/2000 | Anderson | |
| 6,058,248 A | 5/2000 | Atkins et al. | |
| 6,061,523 A | 5/2000 | Kim | |
| 6,067,114 A | 5/2000 | Omata et al. | |
| 6,072,586 A | 6/2000 | Bhargava et al. | |
| 6,075,926 A | 6/2000 | Atkins et al. | |
| 6,091,902 A | 7/2000 | Komatsuzaki et al. | |
| 6,092,023 A | 7/2000 | Kunishige | |
| 6,097,901 A | 8/2000 | Parulski | |
| 6,122,455 A | 9/2000 | Hines | |
| 6,137,534 A | 10/2000 | Anderson | |
| 6,167,469 A | 12/2000 | Safai et al. | |
| 6,188,432 B1 | 2/2001 | Ejima | |
| 6,195,511 B1 | 2/2001 | Harada | |
| 6,205,296 B1 | 3/2001 | Hamada et al. | |
| 6,215,523 B1 | 4/2001 | Anderson | |
| 6,229,566 B1 | 5/2001 | Matsumoto et al. | |
| 6,240,258 B1 | 5/2001 | Yoshikawa | |
| 6,249,316 B1 * | 6/2001 | Anderson | 348/333.05 |
| 6,252,989 B1 | 6/2001 | Geisler et al. | |
| 6,256,061 B1 | 7/2001 | Martin et al. | |
| 6,259,857 B1 | 7/2001 | Miyahara et al. | |
| 6,262,769 B1 | 7/2001 | Anderson et al. | |
| 6,266,085 B1 | 7/2001 | Kato et al. | |
| 6,269,357 B1 | 7/2001 | Nakayama et al. | |
| 6,275,260 B1 | 8/2001 | Anderson | |
| 6,282,231 B1 | 8/2001 | Norman et al. | |
| 6,282,317 B1 | 8/2001 | Luo et al. | |
| 6,287,252 B1 | 9/2001 | Lugo | |
| 6,294,993 B1 | 9/2001 | Calaman | |
| 6,310,648 B1 | 10/2001 | Miller et al. | |
| 6,332,059 B1 | 12/2001 | Kamata et al. | |
| 6,333,761 B2 | 12/2001 | Yasuda | |
| 6,345,274 B1 | 2/2002 | Zhu et al. | |
| 6,381,412 B1 | 4/2002 | Ishito et al. | |
| 6,438,323 B1 | 8/2002 | DeCecca et al. | |
| 6,477,333 B1 | 11/2002 | Manabe et al. | |
| 6,504,552 B2 * | 1/2003 | Phillips | 715/726 |
| 6,505,003 B1 | 1/2003 | Malloy Desormeaux | |
| 6,516,154 B1 | 2/2003 | Parulski et al. | |
| 6,577,821 B2 | 6/2003 | Malloy Desormeaux | |
| 6,584,221 B1 * | 6/2003 | Moghaddam et al. | 382/165 |
| 6,714,205 B1 * | 3/2004 | Miyashita et al. | 345/536 |
| 6,856,708 B1 * | 2/2005 | Aoki | 382/284 |
| 7,006,764 B2 | 2/2006 | Brost | |
| 7,095,907 B1 * | 8/2006 | Berkner et al. | 382/298 |
| 7,206,022 B2 | 4/2007 | Miller et al. | |
| 7,221,805 B1 * | 5/2007 | Bachelder | 382/255 |
| 7,327,890 B2 | 2/2008 | Fredlund | |
| 2002/0019584 A1 | 2/2002 | Schulze et al. | |
| 2002/0076100 A1 | 6/2002 | Luo | |
| 2003/0076312 A1 * | 4/2003 | Yokoyama | 345/204 |
| 2003/0117511 A1 | 6/2003 | Belz et al. | |
| 2004/0109150 A1 * | 6/2004 | Igarashi | 355/67 |
| 2004/0120606 A1 * | 6/2004 | Fredlund | 382/305 |

FOREIGN PATENT DOCUMENTS

| | | |
|---|---|---|
| WO | WO 01/26021 | 4/2001 |
| WO | WO 01/71636 | 9/2001 |
| WO | WO 02/27640 | 4/2002 |

OTHER PUBLICATIONS

International Preliminary Report on Patentability for PCT/US2005/009698, issued Sep. 26, 2006.

International Search Report on PCT/US2005/009698, mailed Jul. 8, 2005.

"Looking at Pictures: Affective facial, visceral, and behavioral reactions", by Peter J. Lang et al., Psychophysiology, 30 (1993) 261-273.

"FotoFile: A Consumer Multimedia Organization and Retrieval System", by Allan Kuchinsky et al., May 1999.

"Facial Expression Recognition using a Dynamic Model and Motion Energy", by Irfan Essa et al. MIT Media Laboratory Perceptual Computing Section Technical Report No. 307, pp. 1-8, Jun. 1995.

Digital Still Camera Image File Format Standard, Version 2.1, Jul. 1998, Japan Electronic Industry Development Association.

"Behind Blue Eyes" by Claire Tristram, Technology Review, May 2001.

Compact Flash Specification Revision 1.4, Compact Flash Association, Jul. 1999.

* cited by examiner

DISPLAY DEVICE AND METHOD FOR DETERMINING AN AREA OF IMPORTANCE IN AN ORIGINAL IMAGE

CROSS-REFERENCE TO RELATED APPLICATIONS

Reference is made to commonly assigned, co-pending U.S. Ser. No. 10/061,385, entitled SYSTEM AND METHOD OF PROCESSING A DIGITAL IMAGE FOR USER ASSESSMENT OF AN OUTPUT IMAGE PRODUCT, filed Feb. 1, 2002 in the name of John R. Randall, et al.; U.S. Ser. No. 10/745,006, entitled DISPLAY DEVICE WITH AUTOMATIC AREA OF IMPORTANCE DISPLAY, filed Dec. 23, 2003 in the name of Susan J. Beck; and U.S. Ser. No. 10/292,684, entitled CAMERA HAVING CONTINUOUSLY CROPPING VIEWFINDER, filed Nov. 12, 2002.

FIELD OF THE INVENTION

The present invention relates to imaging methods and systems that determine an area of importance in an original image.

BACKGROUND OF THE INVENTION

Digital images are becoming an increasingly popular form of info-imaging. One reason for this popularity is the ease with which users can manipulate, edit, alter and enhance such digital images after capture. For example, users often use manual digital imaging and editing tools, such as the crop and zoom tools provided in the Kodak Picture CD software sold by Eastman Kodak Company, Rochester, N.Y., U.S.A., to improve the appearance of digital images. These image editing tools allow a user to limit the image content of an image to emphasize important elements in the image. Other image editing, sorting and other tools can also be usefully applied to portions of images that a user considers to be important after the image has been captured. However, photographers typically make area of importance designations using such tools only on selected images during the post capture phase.

It is often useful to associate an area of interest determination with an image at the time that an image is captured, shared or stored. Building such an association at the time of image capture or during use allows the image to be processed, stored, sorted, and/or shared in a manner that is determined at least in part based upon with the area of importance information. Further, to the extent that that a such a designation can be made in a simple fashion at capture there is a greater likelihood that the photographer will make such a designation for more images and that such designations will be more accurate. In addition, with the increased use of digital cameras and other display devices that enable images to be captured or otherwise obtained, and immediately transmitted a remote recipient, what many users also desire a simple and effective means for manually designating what is important in an image that can be quickly and efficiently executed.

Automatic and semi-automatic image processing and editing algorithms are known. These can be applied to enhance the appearance of a digital image while requiring little user input. These automatic and semi-automatic image processing algorithms analyze the content of an image and apply various assumptions about what a user would likely find to be important elements of an image.

In a first example of an automatic algorithm, large oval shaped objects having color that approximates known flesh tones can be assumed to be important to the user. The degree of presumed importance can be increased where, for example, the large oval face shaped objects are positioned near the center of an image. See for example, commonly assigned U.S. Pat. No. 6,282,317, entitled "Method For Automatic Determination of Main Subjects in Photographic Images" filed by Luo et al. on Dec. 31, 1998. Other algorithms use frequency analysis of the digital data that forms digital images to identify elements of an image that are considered to be of greater importance. Such algorithms make assumptions about what is important in an image based upon analysis of the visual elements of the captured image. See for example commonly assigned U.S. patent application Ser. No. 09/176,805 entitled "Determining Portions of a Digital Image Which are In Focus" filed by Erkkilea et al. on Oct. 22, 1998.

In still another example of an automatic system is described in commonly assigned U.S. patent application Ser. No. 10/303,978, entitled, "Digital Imaging System With Eye Monitoring" filed Nov. 25, 2002, by Miller et al. This application describes an image capture system having an eye monitoring system that stores eye information including eye gaze direction information during an image capture sequence and associates the eye information with an image captured during the image capture sequence. In certain embodiments, context information is also captured with the eye information. The context information is also associated with the image. The eye monitoring system described therein is useful for its intended purpose and has broad application. However, some consumers prefer not to use eye monitoring systems.

In a further example of an automatic system is described in commonly assigned U.S. patent application Ser. No. 10/324,489, entitled "Imaging Method and System For Determining An Area Importance In An Archival Image" filed by Fredlund on Dec. 20, 2002. In this application an imaging system is provided having an image source operable to obtain evaluation images and an original image. A controller causes the image source to obtain a set of evaluation images and an original image. A signal processor compares the evaluation images and the original image to identify portions of the original image that are common to all of the captured images. The signal processor stores area of importance data identifying the portions of the original image that correspond to the common portions and associates the area of importance data with the original image.

Commonly assigned U.S. Pat. No. 6,516,154 entitled "Image Revising Camera and Method" filed by Parulski et al. on Jul. 17, 2001 also describes an automatic method wherein a camera stores an original image in a memory and analyzes image to determine a plurality of parameters. The parameters are matched to one or more of a plurality of editorial suggestions to define a suggestion set. One of the potential set of suggestions includes a change in the active area of the original image that is incorporated into a final print. In this camera, the change in active area is suggested to the camera operator who can, in turn select or reject the suggested change.

While such automatic algorithms are often very useful, some users prefer to manually designate areas of importance in an image. Accordingly, a variety of cameras provide compositional suggestions to users that intend to limit an image to a include important information.

For example, U.S. Pat. No. 5,706,049 entitled "Camera that records and Active Image Area Identifier With an Image" filed by Moghadam et al. on Nov. 30, 1995, describes a camera that includes an image receiver for capturing an image of an object, an optical section for directing image light from the object to the image receiver, and a viewfinder for viewing the object prior to capture together with a tile pattern for specifying active hotspot areas in the viewed image. The tile pattern in the viewfinder is composed of a plurality of individual tile areas that are visible through viewfinder together with the image of the object. The camera further includes means for designating one or more individual tile areas and active areas of the image, and means for recording a location all the active areas in a memory location that is accessible to act apparatus external to the camera. The '049 patent describes a digital camera embodiment having a thumbwheel switch which acts either as a tile pattern selection switch for selecting a particular pattern to be stored in a pattern memory or a tile area designation switch for selectively sequentially highlighting one or more of the stored tile area patterns, until a desired active area is highlighted. A hotspot selection switch is engaged to select one of the designated hotspot areas. The '049 patent, thus is used to designate an area of a captured original image that can be used to perform a function of a hotspot which can be integrated with integration of a display device, presentation system or an HTML browsing system.

In another example of a manual system, commonly assigned U.S. Pat. No. 5,619,738, entitled "Pre-processing Image Editing" filed by Petruchik et al., describes a film camera that includes electronic display. The electronic display is provided with the driver that the presents movable markers to frame and edit the electronically displayed image. Electronic manipulation of the markers provides for zooming and cropping the image, as well as changing the image format and recording horizontal or vertical orientation. The control that records editing data on the film in a predetermined position relative to the exposed scene image. The camera includes an input for selecting print format from a predetermined set of print formats, each having a predetermined size and aspect ratio, and control limits the frame formats to those that are consistent with the selecting print format. A variety of controls and user inputs facilitate the process of selecting and forming the image. These controls permit the camera user to have great flexibility in editing.

Similarly commonly assigned U.S. Pat. No. 5,898,779, entitled "Photographic System With Selected Area Image Authentication" filed by Squilla et al. on Apr. 14, 1997, describes a public key encryption system for authenticating an image. The encryption system comprises means for generating one or more patterns each composed of at least one individual area that is visible together with the image of the object, means for designating at least one individual area as an active area of the image suitable for authentication and for generating location data identifying the active area. In one form, a single grid pattern can be used in which a tile area designation switch is used for cycling through the tile areas and highlighting one tile area after the other to form a user customizable tile pattern. The tile pattern is composed of a number of intersecting lines which define the individual tile areas, one or more of which may be designated as an active area for purposes of securing the image. In the course of deciding which tile areas should become active areas, one or more tile areas are highlighted for consideration. Alternatively, a tile pattern selection switch can be used to select a particular preformed tile pattern having a preformed highlighted area indicating the area to be used. A security service switch is used to designate a particular arrangement of highlighted tile areas or a preformed tile pattern.

In still another example of a manual system, commonly assigned U.S. patent application Ser. No. 10/292,235, entitled "User Interface for Controlling Cropping In An Electronic Camera", filed by Brost on Nov. 12, 2002, describes a camera system that captures an image and presents a light image based upon the captured image. A cropper is disposed in the camera and is switchable among a plurality of settings. Each setting has a different rectangular cross-sectioned window in the viewfinder. A cropping controller is operatively connected to the capture unit and to the cropper. The cropping control has a cropping input element that is accessible external to the body. The cropping input element is movable between first and second opposed cropping control positions to change the settings. The cropping control positions define a cropping control axis that is perpendicular to an optical axis of the capture unit. This approach provides a simplified control structure to allow adjustment of borders for use in cropping an image and provides a useful and commercially viable way to select from among a rage of cropped images, each centered on a scene image.

In another example of this type, cameras that comply with the Advanced Photographic System standards are typically capable of capturing images using a first format having an aspect ratio that corresponds to the aspect ratio of a high definition television and that allow a user to record a signal on the film indicating that a print made from the captured image is to be rendered in the high definition format, in a so-called classic format or a so-called panoramic format. When the classic or panoramic formats are selected, the photofinisher uses a cropped portion of the captured image each centered with respect to the high definition image and each having a different aspect ratio.

What is needed therefore is a display device such as a digital or hybrid camera, Personal Digital Assistant or any other system capable of presenting an electronic image that also has a user interface system that enables rapid and simplified manual designation of an area of importance within a captured image to provide an output from which it can easily be determined which portion of the image has been designated.

It will be appreciated that any system that enables even a modest a reduction in the number of key strokes or user input actions required to execute such a designation is particularly useful because it makes it more likely that a user will make a designation. Accordingly, a further need exists for a display device and a method for enabling a manual designation of an area of importance in an image that is adapted to reduce the overall amount of effort required by the user of a display device to identify an area of importance in the image.

Still another need is for a system that presents evaluation images that allow a user to quickly and more easily to see what is contained in a portion of the image being considered by the user for use in determining an area of importance.

SUMMARY OF THE INVENTION

In one aspect of the invention, a display device is provided. A display device has a source of an original image and a display. A user input system is adapted to generate a non-directional signal in response to a user input action. A controller is provided and is adapted to determine a set of portions of the original image, each portion including less than all of the original image and with the set having at least one portion that is non-central with respect to the original image and to successively designate a different one of a set of portions of the original image in response to each non-directional signal. The controller is further adapted to cause the display to present a portion evaluation image showing the currently designated portion of the original image and to determine an area of importance in the original image based upon the currently designated portion. Wherein each portion evaluation image shows the currently designated portion having a magnification that is greater than the magnification that the currently designated portion has when presented as a part of the original image.

In another aspect of the invention, a display device is provided. The display device has a source of an original image, a display and a user input system adapted to generate an advance signal and a save signal. A controller is provided and is adapted to detect the advance signal and, in response thereto, to cause the display to present a sequence of portion evaluation images each representing the image content of one of a set of different portions of the original image, with the predetermined set of portions including at least one portion that is non-central with respect to the original image. Wherein the controller determines an area of importance in the original image based upon the portion of the original image presented when the controller detects the save signal.

In yet another aspect of the invention, a display device is provided. The display device has a source of an original image, a display, and a user input system adapted to generate and non-directional advance signal in response to a user input action. A controller is adapted to detect the non-directional advance signal and, in response thereto, to define a number of portion evaluation images each comprising image information from a portion of the original image with each portion being located relative to a predefined anchor point within the original image. The controller is further adapted to cause a different portion evaluation image to be presented on the display in response to each advance signal. The controller is additionally adapted to determine, from the non-directional advance signal, a user designation of a portion of the original image and to use the designation to determine an area of importance in the original image. Wherein at least one anchor point is located so that at least one portion is non-central with respect to the original image.

In a further aspect of the invention, a method is provided for operating a display device. In accordance with the method, an original image is obtained and an evaluation image is presented having an appearance that corresponds to the original image. A set of different portions is defined in the original image with each portion comprising less than all of the original image and at least one of the portions being non-central with the original image. A non-directional user input action is detected during presentation of the evaluation image. One of the set of portions is designated in response to each detected non-directional user input action, and a portion evaluation image is presented that corresponds to the designated portion with the portion evaluation image showing the currently designated portion having a magnification that is greater than the magnification that the currently designated portion has when the currently designated portion is presented as a part of the original image. An area of importance is determined based upon the designated portion.

In still another aspect of the invention, a method for operating a display device is provided. In accordance with the method, an original image is obtained and an evaluation image of the original image is displayed. An advance a user input action is detected that does not include a directional input relative to the displayed evaluation image. At least one portion of a set of different portions of the original image is selected based upon the user input action. A portion evaluation image is presented that indicates the image information in the original image that is contained within the currently designated portion. A save user input action is detected and an area of importance is determined based upon the selected portion displayed when the user save input user action is detected. Wherein at least one of the predetermined set of portions of the original image is non-central with respect to the original image.

DETAILED DESCRIPTION OF THE INVENTION

Figure 1:
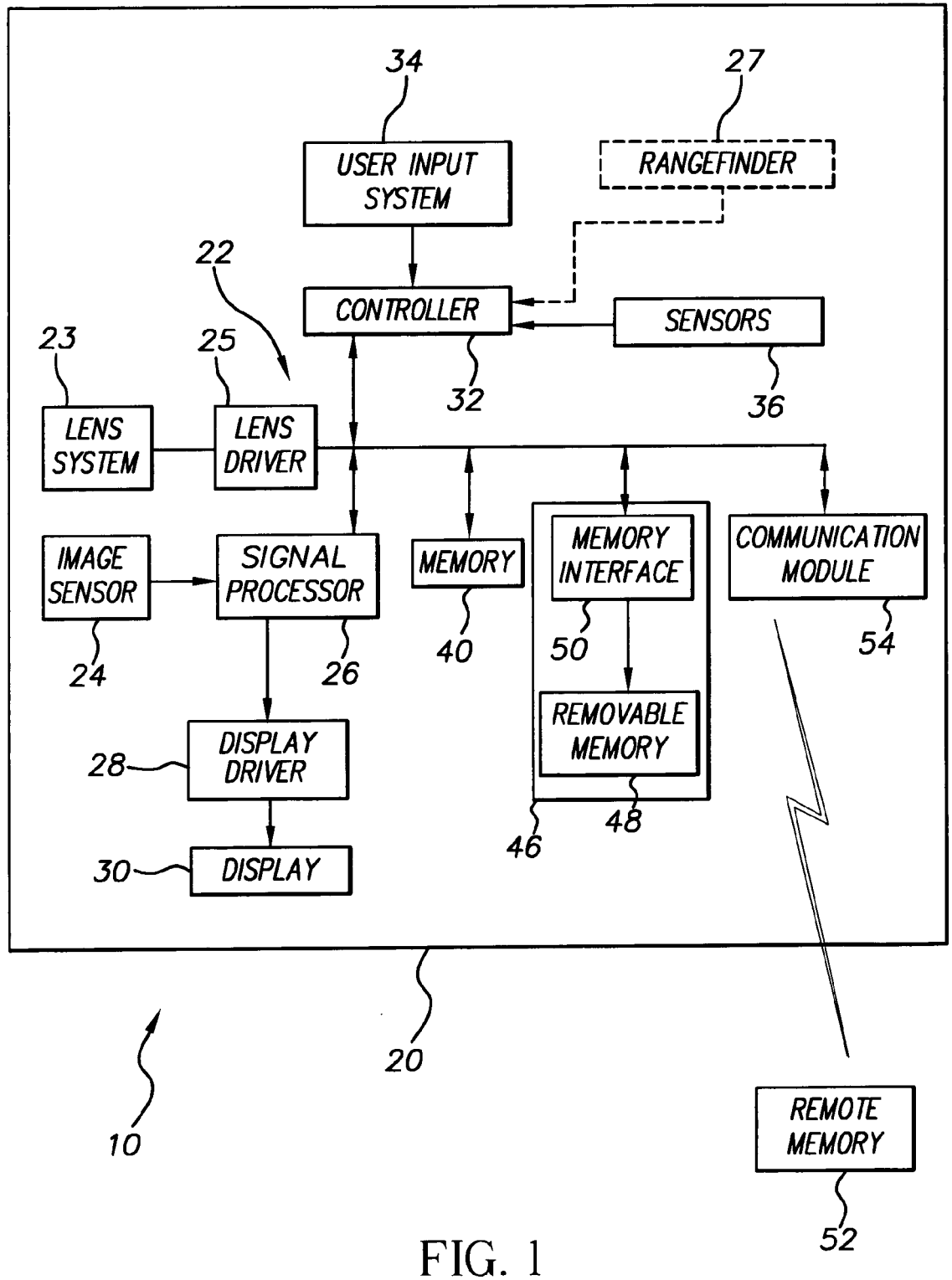
FIG. 1 is an illustration of one simplified block diagram of one exemplary embodiment of a display device according to the present invention.
Figure 2:
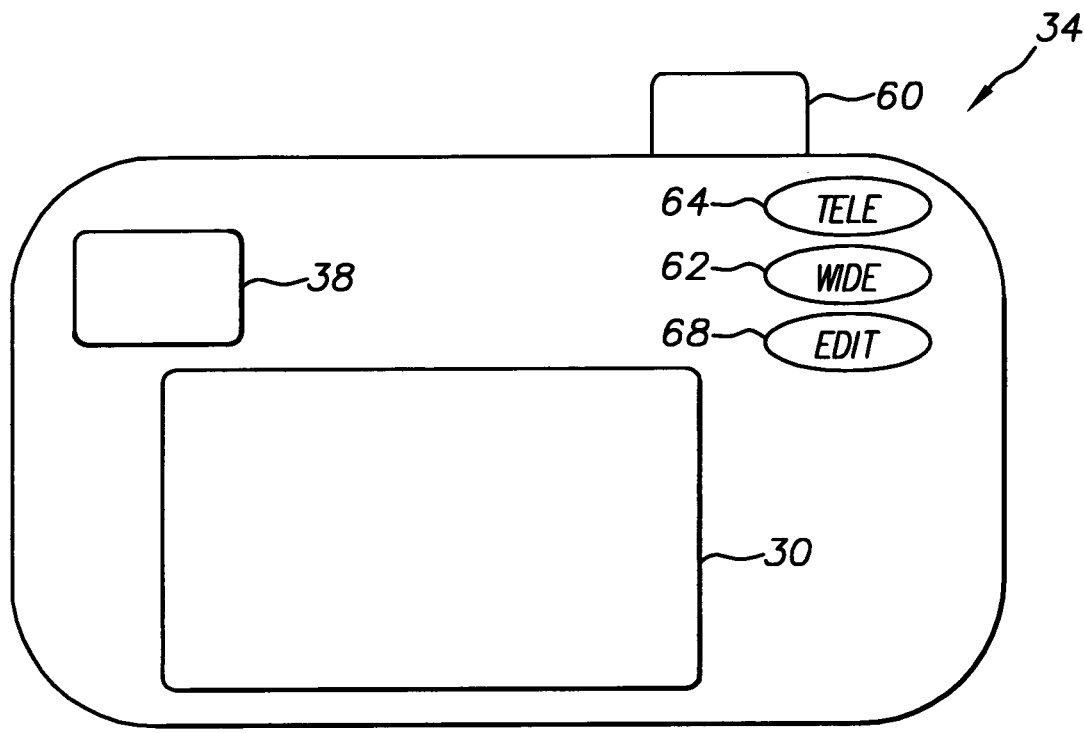
FIG. 2 is an illustration of a back view of the display device of FIG. 1.

FIG. 1 shows a block diagram of an embodiment of a display device 10. FIG. 2 shows a back, elevation view of the display device 10 of FIG. 1. As is shown in FIGS. 1 and 2, display device 10 takes the form of a digital camera 12 comprising a body 20 containing an image capture system 22 having a lens system 23, an image sensor 24, a signal processor 26, an optional display driver 28 and a display 30. In operation, light from a scene is focused by lens system 23 to form an image on image sensor 24. Lens system 23 can have one or more elements.

Lens system 23 can be of a fixed focus type or can be manually or automatically adjustable. In the embodiment shown in FIG. 1, lens system 23 is automatically adjusted. Lens system 23 can be simple, such as having a single focal length with manual focusing or a fixed focus. In the example embodiment shown in FIG. 1, taking lens unit 22 is a motorized 6× zoom lens unit in which a mobile element or elements (not shown) are driven, relative to a stationary element or elements (not shown) by lens driver 25. Lens driver 25 controls both the lens focal length and the lens focus position of lens system 23 and sets a lens focal length and/or position based upon signals from signal processor 26, an optional automatic range finder system 27, and/or controller 32.

The focal length and/or focus position of lens system 23 can be automatically selected using a variety of known strategies. For example, in one embodiment, image sensor 24 is used to provide multi-spot autofocus using what is called the "through focus" or "whole way scanning" approach. In such an approach the scene is divided into a grid of regions or spots, and the optimum focus distance is determined for each image region. The optimum focus distance for each region is determined by moving lens system 23 through a range of focus distance positions, from the near focus distance to the infinity position, while capturing images. Depending on the design of digital camera 12, between four and thirty-two images may need to be captured at different focus distances. Typically, capturing images at eight different distances provides suitable accuracy.

The captured image data is then analyzed to determine the optimum focus distance for each image region. This analysis begins by band-pass filtering the sensor signal using one or more filters, as described in commonly assigned U.S. Pat. No. 5,874,994 "Filter Employing Arithmetic Operations for an Electronic Synchronized Digital Camera" filed by Xie et al., on Dec. 11, 1995, the disclosure of which is herein incorporated by reference. The absolute value of the bandpass filter output for each image region is then peak detected, in order to determine a focus value for that image region, at that focus distance. After the focus values for each image region are determined for each captured focus distance position, the optimum focus distances for each image region can be determined by selecting the captured focus distance that provides the maximum focus value, or by estimating an intermediate distance value, between the two measured captured focus distances which provided the two largest focus values, using various interpolation techniques.

The lens focus distance to be used to capture a digital image can now be determined. In a preferred embodiment, the image regions corresponding to a target object (e.g. a person being photographed) are determined. The focus position is then set to provide the best focus for these image regions. For example, an image of a scene can be divided into a plurality of sub-divisions. A focus evaluation value representative of the high frequency component contained in each subdivision of the image can be determined and the focus evaluation values can be used to determine object distances as described in commonly assigned U.S. Pat. No. 5,877,809 entitled "Method Of Automatic Object Detection In An Image", filed by Omata et al. on Oct. 15, 1996, the disclosure of which is herein incorporated by reference. If the target object is moving, object tracking may be performed, as described in commonly assigned U.S. Pat. No. 6,067,114 entitled "Detecting Compositional Change in Image" filed by Omata et al. on Oct. 26, 1996, the disclosure of which is herein incorporated by reference. In an alternative embodiment, the focus values determined by "whole way scanning" are used to set a rough focus position, which is refined using a fine focus mode, as described in commonly assigned U.S. Pat. No. 5,715,483, entitled "Automatic Focusing Apparatus and Method", filed by Omata et al. on Oct. 11, 1998, the disclosure of which is herein incorporated by reference.

In one embodiment, bandpass filtering and other calculations used to provide auto-focus information for digital camera 12 are performed by digital signal processor 26. In this embodiment, digital camera 12 uses a specially adapted image sensor 24, as is shown in commonly assigned U.S. Pat. No. 5,668,597 entitled "An Electronic Camera With Rapid Automatic Focus Of An Image Upon A Progressive Scan Image Sensor", filed by Parulski et al. on Dec. 30, 1994, the disclosure of which is herein incorporated by reference, to automatically set the lens focus position. As described in the '597 patent, only some of the lines of sensor photoelements (e.g. only ¼ of the lines) are used to determine the focus. The other lines are eliminated during the sensor readout process. This reduces the sensor readout time, thus shortening the time required to focus lens system 23.

In an alternative embodiment, digital camera 12 uses a separate optical or other type (e.g. ultrasonic) of rangefinder 27 to identify the subject of the image and to select a focus position for lens system 23 that is appropriate for the distance to the subject. Rangefinder 27 can operate lens driver 25, directly or as shown in FIG. 1, can provide signals to signal processor 26 or controller 32 from which signal processor 26 or controller 32 can generate signals that are to be used for image capture. A wide variety of suitable multiple sensor rangefinders 27 known to those of skill in the art are suitable for use. For example, U.S. Pat. No. 5,440,369 entitled "Compact Camera With Automatic Focal Length Dependent Exposure Adjustments" filed by Tabata et al. on Nov. 30, 1993, the disclosure of which is herein incorporated by reference, discloses one such rangefinder 27. The focus determination provided by rangefinder 27 can be of the single-spot or multi-spot type. Preferably, the focus determination uses multiple spots. In multi-spot focus determination, the scene is divided into a grid of areas or spots, and the optimum focus distance is determined for each spot. One of the spots is identified as the subject of the image and the focus distance for that spot is used to set the focus of lens system 23.

A feedback loop is established between lens driver 25 and camera controller 32 so that camera controller 32 can accurately set the focus position of lens system 23.

Lens system 23 is also optionally adjustable to provide a variable zoom. In the embodiment shown lens driver 25 automatically adjusts the position of one or more mobile elements (not shown) relative to one or more stationary elements (not shown) of lens system 23 based upon signals from signal processor 26, an automatic range finder system 27, and/or controller 32 to provide a zoom magnification. Lens system 23 can be of a fixed magnification, manually adjustable and/or can employ other known arrangements for providing an adjustable zoom.

Light from the scene that is focused by lens system 23 onto image sensor 24 is converted into image signals representing an image of the scene. Image sensor 24 can comprise a charge couple device (CCD), a complimentary metal oxide sensor (CMOS), or any other electronic image sensor known to those of ordinary skill in the art. The image signals can be in digital or analog form.

Signal processor 26 receives image signals from image sensor 24 and transforms the image signals into an image in the form of digital data. The digital image can comprise one or more still images, multiple still images and/or a stream of apparently moving images such as a video segment. Where the digital image data comprises a stream of apparently moving images, the digital image data can comprise image data stored in an interleaved or interlaced image form, a sequence of still images, and/or other forms known to those of skill in the art of digital video.

Signal processor 26 can apply various image processing algorithms to the image signals when forming a digital image. These can include but are not limited to color and exposure balancing, interpolation and compression. Where the image signals are in the form of analog signals, signal processor 26 also converts these analog signals into a digital form.

Controller 32 controls the operation the display device 10 during imaging operations, including but not limited to image capture system 22, display 30 and memory such as memory 40. Controller 32 causes image sensor 24, signal processor 26, display 30 and memory 40 to capture and store original images in response to signals received from a user input system 34, data from signal processor 26 and data received from optional sensors 36. Controller 32 can comprise a microprocessor such as a programmable general purpose microprocessor, a dedicated micro-processor or micro-controller, a combination of discrete components or any other system that can be used to control operation of display device 10.

Controller 32 cooperates with a user input system 34 to allow display device 10 to interact with a user. User input system 34 can comprise any form of transducer or other device capable of receiving an input from a user and converting this input into a form that can be used by controller 32 in operating display device 10. For example, user input system 34 can comprise a touch screen input, a touch pad input, a 4-way switch, a 6-way switch, an 8-way switch, a stylus system, a trackball system, a joystick system, a voice recognition system, a gesture recognition system or other such systems. In the digital camera 12 embodiment of display device 10 shown in FIGS. 1 and 2 user input system 34 includes a shutter trigger button 60 that sends a trigger signal to controller 32 indicating a desire to capture an image.

In the embodiment shown in FIGS. 1 and 2, user input system 34 also includes a wide-angle zoom button 62 and a tele-zoom button 64 that cooperate with controller 32 to control the zoom settings of lens system 23 causing lens system 23 to zoom out when wide angle zoom button 62 is depressed and to zoom in when tele-zoom button 64 is depressed. Wide-angle zoom lens button 62 and telephoto zoom button 64 can also be used to provide signals that cause signal processor 26 to process image signal so that the digital image formed thereby appears to have been captured at a different zoom setting than that actually provided by the optical lens system. This can be done by using a subset of the image signals from image sensor 24 and interpolating the subset of the image signals to form the digital image. User input system 34 can also include other buttons including the edit button 66 shown in FIG. 2, the function of which will be described in greater detail below.

Sensors 36 are optional and can include light sensors and other sensors known in the art that can be used to detect conditions in the environment surrounding display device 10 and to convert this information into a form that can be used by controller 32 in governing operation of display device 10. Sensors 36 can also include biometric sensors adapted to detect characteristics of a user for security and affective imaging purposes.

Controller 32 causes an image signal and corresponding digital image to be formed when a trigger condition is detected. Typically, the trigger condition occurs when a user depresses shutter trigger button 60, however, controller 32 can determine that a trigger condition exists at a particular time, or at a particular time after shutter trigger button 60 is depressed. Alternatively, controller 32 can determine that a trigger condition exists when optional sensors 36 detect certain environmental conditions.

Controller 32 can also be used to generate metadata in association with each image. Metadata is data that is related to a digital image or a portion of a digital image but that is not necessarily observable in the image itself. In this regard, controller 32 can receive signals from signal processor 26, camera user input system 34 and other sensors 36 and, optionally, generates metadata based upon such signals. The metadata can include but is not limited to information such as the time, date and location that the original image was captured, the type of image sensor 24, mode setting information, integration time information, taking lens unit setting information that characterizes the process used to capture the original image and processes, methods and algorithms used by display device 10 to form the original image. The metadata can also include but is not limited to any other information determined by controller 32 or stored in any memory in display device 10 such as information that identifies display device 10, and/or instructions for rendering or otherwise processing the digital image with which the metadata is associated. The metadata can also comprise an instruction to incorporate a particular message into digital image when presented. Such a message can be a text message to be rendered when the digital image is presented or rendered. The metadata can also include audio signals. The metadata can further include digital image data. The metadata can also include any other information entered into display device 10.

The digital images and optional metadata, can be stored in a compressed form. For example where the digital image comprises a sequence of still images, the still images can be stored in a compressed form such as by using the JPEG (Joint Photographic Experts Group) ISO 10918-1 (ITU-T.81) standard. This JPEG compressed image data is stored using the so-called "Exif" image format defined in the Exchangeable Image File Format version 2.2 published by the Japan Electronics and Information Technology Industries Association JEITA CP-3451. Similarly, other compression systems such as the MPEG-4 (Motion Pictures Export Group) or Apple QuickTime™ standard can be used to store digital image data in a video form. Other image compression and storage forms can be used.

The digital images and metadata can be stored in a memory such as memory 40. Memory 40 can include conventional memory devices including solid state, magnetic, optical or other data storage devices. Memory 40 can be fixed within display device 10 or it can be removable. In the embodiment of FIG. 1, display device 10 is shown having a memory card slot 46 that holds a removable memory 48 such as a removable memory card and has a removable memory interface 50 for communicating with removable memory 48. The digital images and metadata can also be stored in a remote memory system 52 that is external to display device 10 such as a personal computer, computer network or other imaging system.

In the embodiment shown in FIGS. 1 and 2, display device 10 has a communication module 54 for communicating with remote memory system 52. The communication module 54 can be for example, an optical, radio frequency or other transducer that converts image and other data into a form that can be conveyed to the remote display device by way of an optical signal, radio frequency signal or other form of signal. Communication module 54 can also be used to receive a digital image and other information from a host computer or network (not shown). Controller 32 can also receive information and instructions from signals received by communication module 54 including but not limited to, signals from a remote control device (not shown) such as a remote trigger button (not shown) and can operate display device 10 in accordance with such signals.

Signal processor 26 and/or controller 32 also use image signals or the digital images to form evaluation images which have an appearance that corresponds to original images stored in display device 10 and are adapted for presentation on display 30. This allows users of display device 10 to use a display such as display 30 to view images that correspond to original images that are available in display device 10. Such images can include, for example images that have been captured by image capture system 22, and/or that were otherwise obtained such as by way of communication module 54 and stored in a memory such as memory 40 or removable memory 48.

Display 30 can comprise, for example, a color liquid crystal display (LCD), organic light emitting display (OLED) also known as an organic electro-luminescent display (OELD) or other type of video display. Display 30 can be external as is shown in FIG. 2, or it can be internal for example used in a viewfinder system 38. Alternatively, display device 10 can have more than one display 30 with, for example, one being external and one internal.

Signal processor 26 and/or controller 32 can also cooperate to generate other images such as text, graphics, icons and other information for presentation on display 30 that can allow interactive communication between controller 32 and a user of display device 10, with display 30 providing information to the user of display device 10 and the user of display device 10 using user input system 34 to interactively provide information to display device 10. Display device 10 can also have other displays such as a segmented LCD or LED display (not shown) which can also permit signal processor 26 and/or controller 32 to provide information to user 10. This capability is used for a variety of purposes such as establishing modes of operation, entering control settings, user preferences, and providing warnings and instructions to a user of display device 10. Other systems such as known systems and actuators for generating audio signals, vibrations, haptic feedback and other forms of signals can also be incorporated into display device 10 for use in providing information, feedback and warnings to the user of display device 10.

Typically, display 30 has less imaging resolution than image sensor 24. Accordingly, signal processor 26 reduces the resolution of image signal or digital image when forming evaluation images adapted for presentation on display 30. Down sampling and other conventional techniques for reducing the overall imaging resolution can be used. For example, resampling techniques such as are described in commonly assigned U.S. Pat. No. 5,164,831 "Electronic Still Camera Providing Multi-Format Storage Of Full And Reduced Resolution Images" filed by Kuchta et al. on Mar. 15, 1990, can be used. The evaluation images can optionally be stored in a memory such as memory 40. The evaluation images can be adapted to be provided to an optional display driver 28 that can be used to drive display 30. Alternatively, the evaluation images can be converted into signals that can be transmitted by signal processor 26 in a form that directly causes display 30 to present the evaluation images. Where this is done, display driver 28 can be omitted.

Display device 10 can obtain original images for processing in a variety of ways. For example, display device 10 can capture an original image using an image capture system 22 as described above. Imaging operations that can be used to obtain an original image using image capture system 22 include a capture process and can optionally also include a composition process and a verification process.

During the optional composition process, controller 32 optionally provides an electronic viewfinder effect on display 30. In this regard, controller 32 causes signal processor 26 to cooperate with image sensor 24 to capture preview digital images during composition and to present a corresponding evaluation images on display 30.

In the embodiment shown in FIGS. 1 and 2, controller 32 enters the image composition process when shutter trigger button 60 is moved to a half depression position. However, other methods for determining when to enter a composition process can be used. For example, one of user input system 34, for example, the edit button 68 shown in FIG. 2 can be depressed by a user of display device 10, and can be interpreted by controller 32 as an instruction to enter the composition process. The evaluation images presented during composition can help a user to compose the scene for the capture of an original image.

The capture process is executed in response to controller 32 determining that a trigger condition exists. In the embodiment of FIGS. 1 and 2, a trigger signal is generated when shutter trigger button 60 is moved to a full depression condition and controller 32 determines that a trigger condition exists when controller 32 detects the trigger signal. During the capture process, controller 32 sends a capture signal causing signal processor 26 to obtain image signals from image sensor 24 and to process the image signals to form digital image data comprising an original digital image.

During the verification process, an evaluation image corresponding to the original digital image is optionally formed for presentation on display 30 by signal processor 26 based upon the image signal. In one alternative embodiment, signal processor 26 converts each image signal into a digital image and then derives the corresponding evaluation image from the original digital image. The corresponding evaluation image is supplied to display 30 and is presented for a period of time. This permits a user to verify that the digital image has a preferred appearance.

Original images can also be obtained by display device 10 in ways other than image capture. For example, original images can by conveyed to display device 10 when such images are recorded on a removable memory that is operatively associated with memory interface 50. Alternatively, original images can be received by way of communication module 54. For example, where communication module 54 is adapted to communicate by way of a cellular telephone network, communication module 54 can be associated with a cellular telephone number or other identifying number that for example another user of the cellular telephone network such as the user of a telephone equipped with a digital camera can use to establish a communication link with display device 10 and transmit images which can be received by communication module 54. Accordingly, there are a variety of ways in which display device 10 can receive images and therefore it is not essential that display device 10 have an image capture system so long as other means such as those described above are available for importing images into display device 10.

Figure 3:
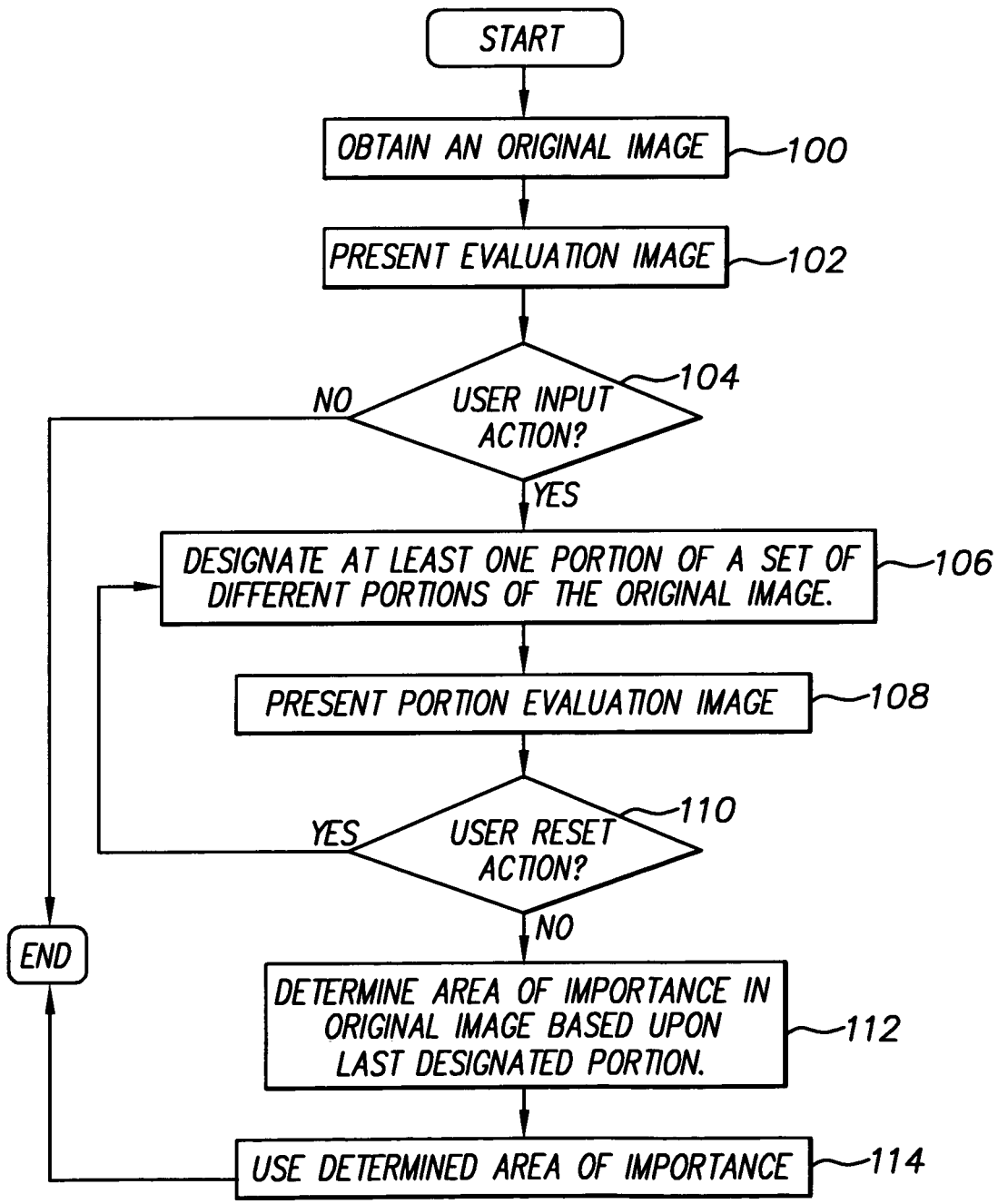
FIG. 3 is a flow diagram of one embodiment of the invention.

FIG. 3 shows a flow diagram depicting a first embodiment of a method for determining an area of importance in an archival image using, for example, display device 10. In accordance with the method, an original image is obtained (step 100). This can be done by capture or by importing the original image as discussed above, using other conventional archival image capture or downloading techniques. For example, as discussed above, an original image can be any digital image that is captured by image capture system 22, downloaded form a removable memory 48, or otherwise obtained by communication module 54.

After the original image is obtained, an evaluation image is presented (step 102). Under certain circumstances, where, for example, the imaging capabilities of display 30 has sufficient image resolution, the evaluation image can comprise the original image. In circumstances where the original image provides more image information than can be presented using display 30, controller 32 can cause the formation of an evaluation image by down sampling or otherwise adapting the original image to form an evaluation image to based upon the original image as described above. Such an evaluation image has an appearance that corresponds to the appearance of the original image and is adapted for presentation using display 30.

It is then determined whether a user input action has occurs (step 104). Typically, the user input action comprises some action that can be sensed by user input system 34. This can take a variety of forms. For example, the user input action can comprise pressing edit button 68 shown in FIG. 2. In this example, when edit button 68 is pressed user input system 34 generates an edit signal that is received by controller 32. When controller 32 receives the edit signal, controller 32 determines that a user input action has occurred. The user input action can take a wide variety of other forms only some of which will be described in greater detail later herein and, user input system 34 and controller 32 will be adapted to cooperate with such different forms of user input actions.

In the embodiment of FIG. 3, when a user input action is detected, controller 32 designates at least one portion of a set of portions of the original image (step 106). In this regard, controller 32, optionally in cooperation with signal processor 34, defines a set of different portions within the original image. Each portion comprises at least some of the original image. The sizes, locations, aspect ratios, and shapes of each portion within the set can vary. At least one of the portions can be centered along a non-central portion of the original image. A set of portions can incorporate a variety of different portions. In one embodiment, between 3 and 30 different portions are provided, in another embodiment, nine different portions are provided, and in still other embodiments one hundred or more portions can be incorporated in the set.

The set of portions can comprise portions that take on a variety of similar or disparate shapes and sizes. For example, in one embodiment, all of the portions can comprise an area which can incorporate for example, 75 percent of the image space provided by the original image and can have the same aspect ratio as the original image. However, the multiple portions differ from each other based upon where the portions are located relative to the original image. For example, a first portion can be centered with respect to the original image while at least one other portion defines an area of the original image that is not centered with respect to the original image. For example, one such non-central predefined portion can be centered on the original image along the horizontal axis of the original image but may be shifted vertically for example downward, so that the lower edge of the portion lays on top of the lower edge of the evaluation copy of the original image.

Additionally, a portion of an original image can be defined in any way that the designers of display device 10 believe to be useful to a user designating a portion of the original image as an area of the importance. Although, in the above described example, the portions have been described as being identical in size, but varied in location, is also possible that the portions could vary in size, aspect ratio, shape, or in combinations of these or other parameters.

The set of portions can also be defined based upon analysis of the original image performed in an image analysis step (not shown). In one example embodiment of this type an original image can be analyzed using known techniques such as frequency analysis to identify areas of the original image that are in focus and can define portions that correspond to different ones of the in focus area. In another embodiment, where display device 10 comprises a digital camera, the original image can be separated into portions based upon focus distance information obtained, for example, during an autofocus process. More complex scene image analysis techniques including, but not limited to, edge detection, illumination pattern recognition, and focus identification techniques can be applied to the original image by controller 32 and/or signal processor 34 to identify useful portions of the original image, such as potential subject areas within the original image.

Figure 4:
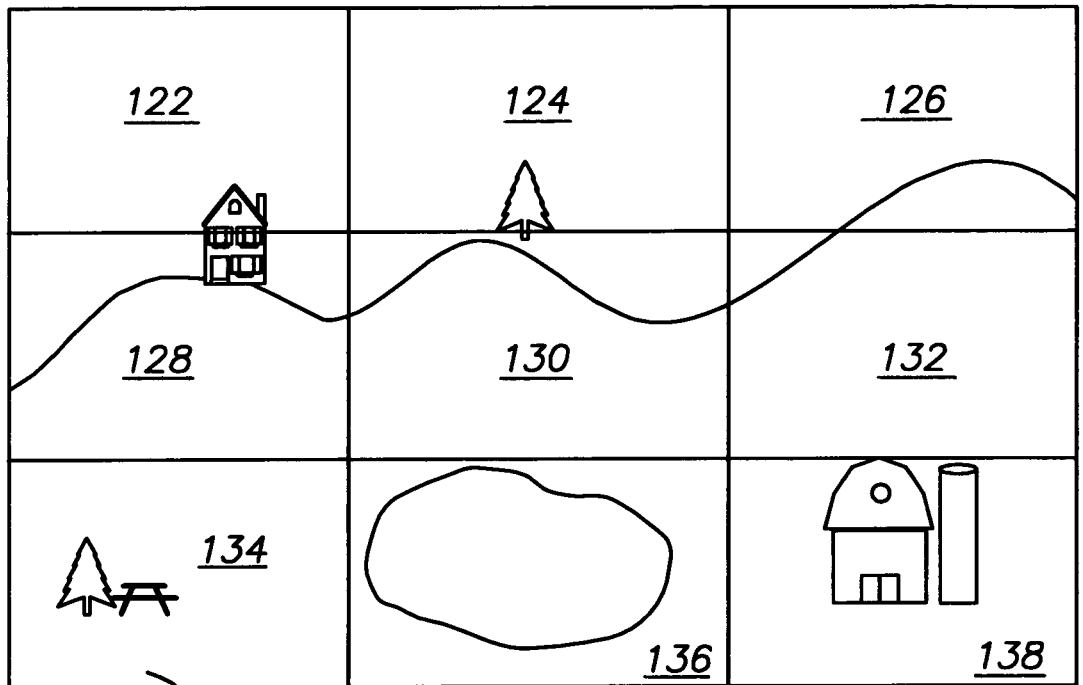
FIG. 4 is an illustration of an original image with one arrangement of portions associated therewith.
Figure 5:
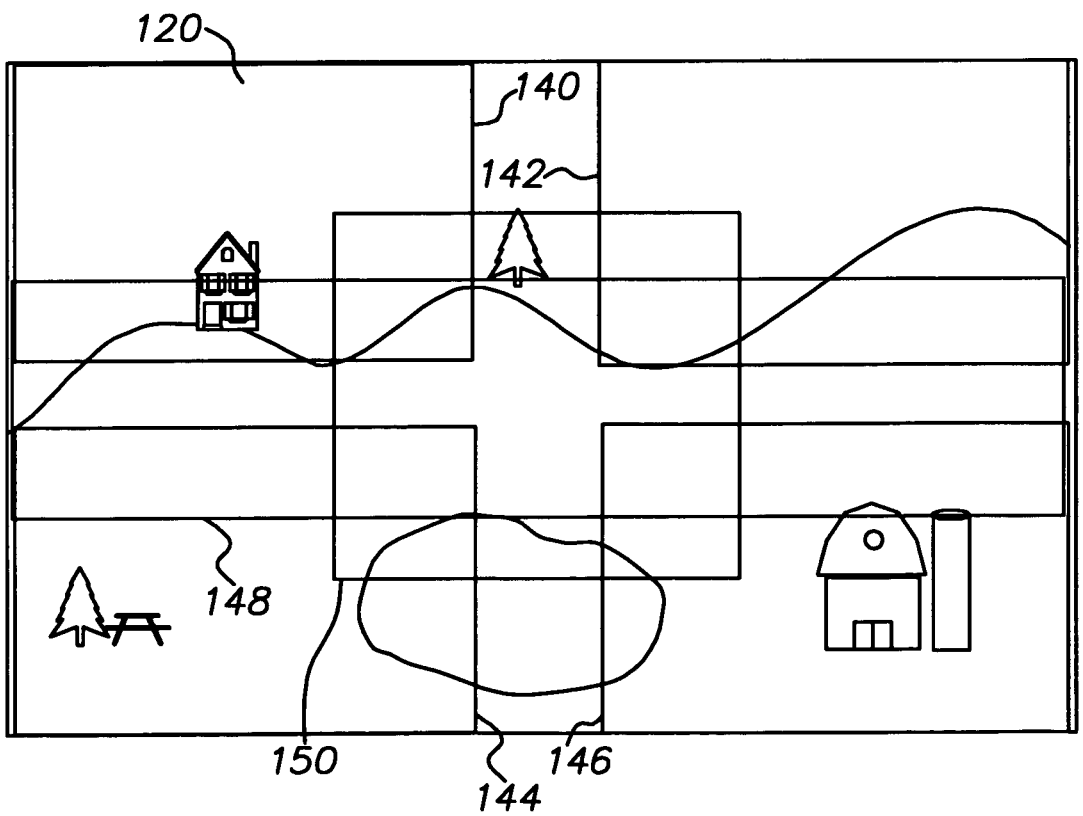
FIG. 5 is an illustration of an original image with another arrangement of portions associated therewith.

FIG. 4 shows one example of illustration of a set of portions of an original image 120. As is shown in FIG. 4, original image 120 is divided into portions 122, 124, 126, 128, 130, 132, 134, 136, and 138. It will be appreciated that, in this example, each of the portions is separate from the other portions. However, this is not necessary and, the portions can at least in part overlap, as is illustrated in FIG. 5 which shows original image 120 having a set of six portions 140, 142, 144, 146, 148 and 150 some of which overlap. As is also illustrated in FIG. 5, the portions can be shaped differently.

A first portion from the set of portions is automatically designated by controller 32 when the user input action is detected (step 106). In one embodiment of the invention, controller 32 is adapted to designate portions in the set of portions using a predetermined sequence. For example, when a user of display device 10 first depresses edit button 68, controller 32 can designate a first portion from the set of portions of in accordance with the predetermined sequence designated for the set of portions. However, the sequence and order of designation is not critical and can vary.

Controller 32 and, optionally, signal processor 34, cause a portion evaluation image to be presented for the designated portion (step 108). The portion evaluation image indicates the image information in the original image that is contained within the currently designated portion.

Figure 6:
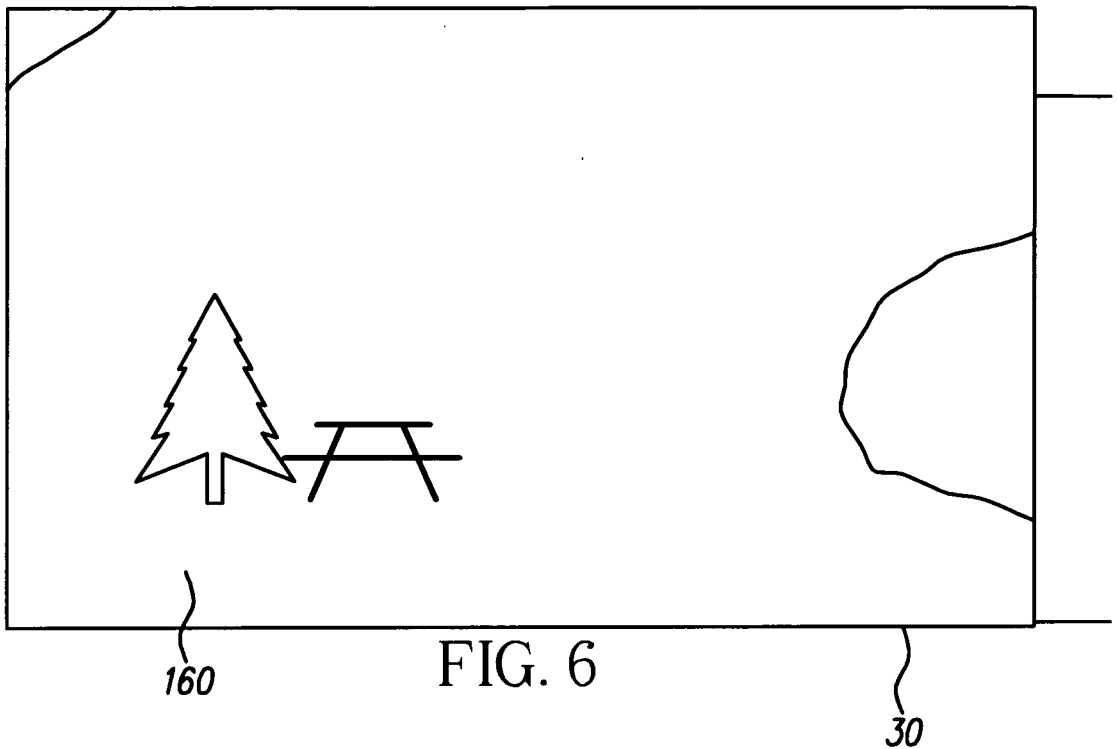
FIG. 6 shows one embodiment of a portion evaluation image.

A portion evaluation image can be formed in a variety of ways. One form of a portion evaluation image 160 is shown in FIG. 6, this type of portion evaluation image comprises an image that includes only image information from the currently designated portion such as portion 138 of FIG. 4. An advantage of this type of portion evaluation image is that it shows the designated portion having an appearance that is magnified as compared to the appearance of the designated portion when the designated portion is presented on display 30 together with other image elements of the original image. Because of this, a user who observes the presented portion evaluation image can have an opportunity to view the designated portion in greater detail and can thereby detect errors or other image conditions that the user may find undesirable in the image and that may not be readily apparent in the designated portion when the designated portion is presented together with other image information from the original image.

Figure 7:
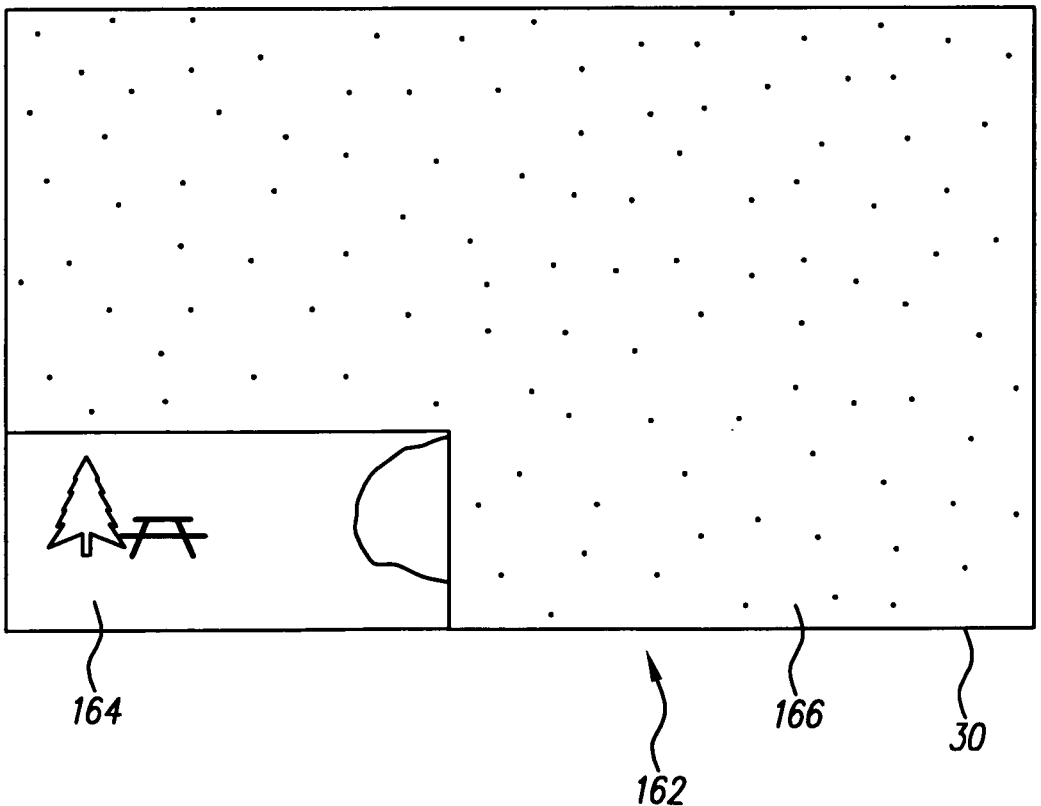
FIG. 7 shows another embodiment of a portion evaluation image.

An alternate embodiment of a method for presenting a portion evaluation image 162 is shown in FIG. 7. As is shown in FIG. 7, in this embodiment, a portion evaluation image 162 is provided having all of the image information from original image 120 with portions that are outside of a currently designated portion 164 being masked by mask 166. In the embodiment shown, mask 166 comprises an opaque region superimposed over non-designated portions of the evaluation image. However, it is not necessary that mask 166 is fully opaque and, in practice, mask 166, can comprise any form of alteration to the appearance of an evaluation image 160 that can be used to demarcate or to visually separate a designated portion 164 from other portions of evaluation image 160. For example, the appearance of the designated portions of evaluation image 160 can be adjusted to appear without color, with modified color or can appear with obviously adjusted sharpness.

Figure 8:
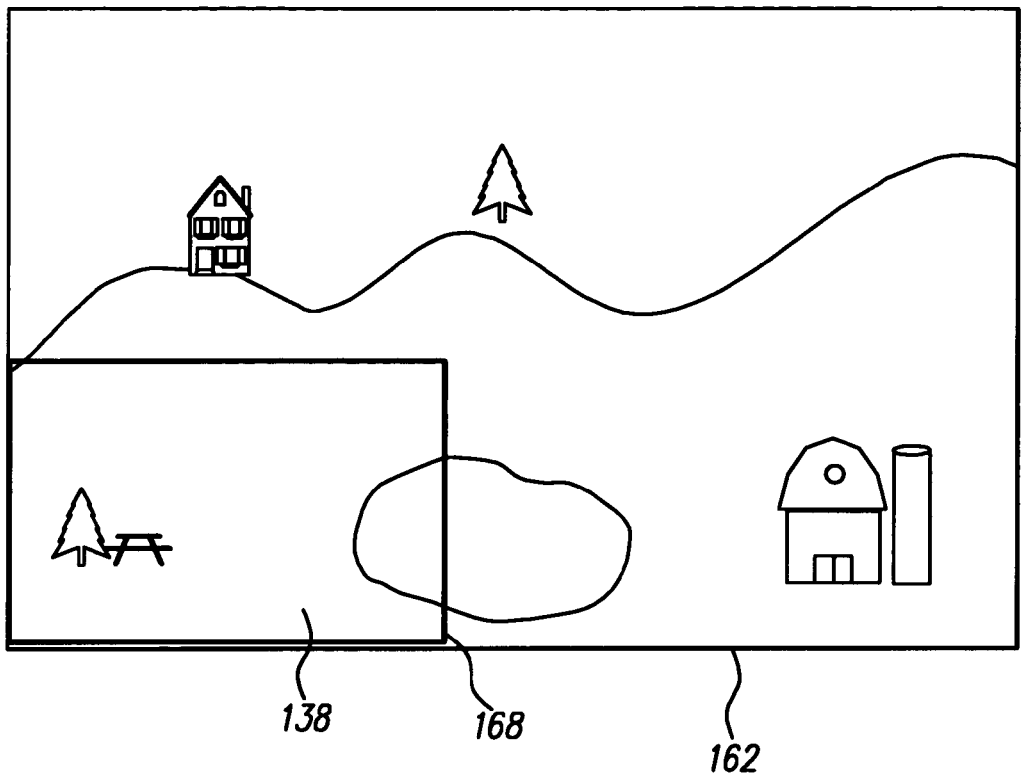
FIG. 8 shows still another embodiment of a portion evaluation image.

In still another embodiment, shown in FIG. 8, a designated portion such as portion 138 of original image 120 is shown in a portion evaluation image 162 as being separated from other portions of evaluation image 160 presented on display 30 having substantially all of the image information from original image 120 using a separator 168 such as a line. The portion evaluation image can take other forms.

Figure 9:
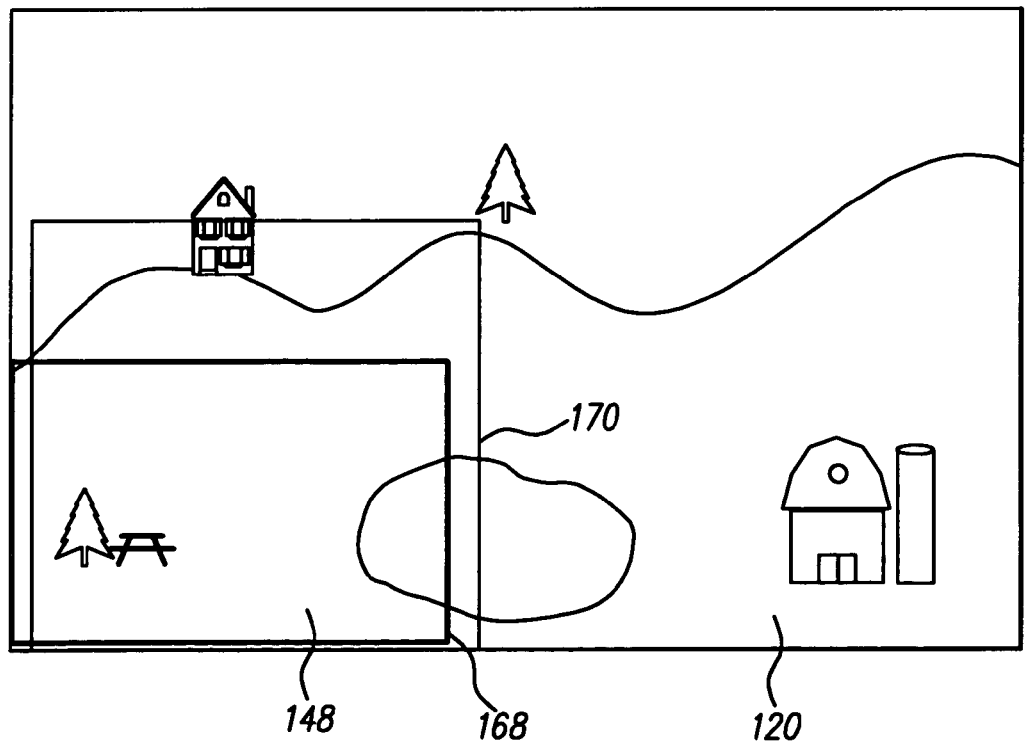
FIG. 9 illustrates an area of importance based upon a designated portion of an original image.

Returning onto FIG. 3, during or after the presentation of a portion evaluation image that shows a currently designated portion, controller 32 monitors user input system 34 to detect a user reset action (step 110). A user reset action can comprise any form of user action that can be detected by user input system 34 and that provides a reset signal to controller 32. When controller 32 detects such a reset signal, controller 32 determines that a currently designated portion of the original image is not to be considered to be the designated portion. The user reset action can be an instruction to user input system 34 indicating that the user wishes to select a different portion. Alternatively, the user reset action can comprise a signal indicating that the user does not wish to designate any portion of the original image. Where a user elects not to designate a portion, the designating process ends.

Where a user does not enter a reset action controller 32 determines an area importance based upon the designation (step 112). In one embodiment, the area of importance determination is made by determining that the area in the designated portion comprises the area of importance. In another embodiment, the area importance determination can be made by defining the original image for use as an area importance based upon the designated portion. For example, where portion 148 of FIG. 5 is selected as the designated portion, controller 32 can determine that the area of importance comprises an area that includes the area of importance designated portion, but is not necessarily coextensive therewith. In this example, as is shown in FIG. 9, the designated area can comprise, for example, an area importance 170 having a different shape or aspect ratio that is located within an original image 120 based upon the location of the determined designated portion shown in this example as portion 148. It will be appreciated that this can be done in a variety of ways.

After an area importance is determined for the original image, the area importance determination is used by controller 32 for some purpose (step 114). In one embodiment, controller 32 is adapted to generate area of importance data based upon determined area importance and to associate the generated area of importance data with the original image. The area importance data can comprise, any form of data or other encodement of information from which a user of the original image can determine which portion of the original image was designated to be important by the user.

The area of importance data can be associated with the original image in a variety of ways. For example, area importance data can be stored as metadata in a digital image that is formed based upon the original image, or in metadata that is stored with the original image itself. In cases where display device 10 incorporates an electronic image capture unit and a film image capture unit, the area of importance data can be stored with an original image recorded on the film for example using optical or magnetic encodements.

In still another embodiment, controller 32 can associate the area of importance data with the original image by generating a revised image based upon image information from the area of importance. This revised image can be stored in association with the original image or some image other image derived therefrom. The revised image can be also be stored, without preserving the original image. This latter alternative has the advantage of conserving memory space inside a display device 10 and in certain implementations it can reduce the amount of data required to store the desired image by using a only a fraction of the image information in the original image or by adjusting compression parameters used in forming an image for storage based upon the original image by using only modest degrees of compression for image elements that are within the area importance of the original image and by using more extensive degrees of compression for storing image information from areas that are not within the area importance in the original image.

Controller 32 can also use the determined area of importance for other purposes. For example, controller 32 can use the determined area of importance in making determinations about post capture image editing and modification. For example, the white balance and/or exposure settings used by controller 32 and/or signal processor 34 to form the original image can be adjusted electronically based upon analysis of the determined area of importance. Further, controller 32 and/or signal processor 34 can determine a variety of camera settings based upon conditions determined in the area importance. The determined area of importance can then be used to edit and modify the original image, such as for image cropping and similar such functions, to define capture parameters for subsequent image capture, or to provide information in the form of metadata that can be associated with the original image for use in later processing and evaluation, analysis, and/or use of the original image.

Figure 10:
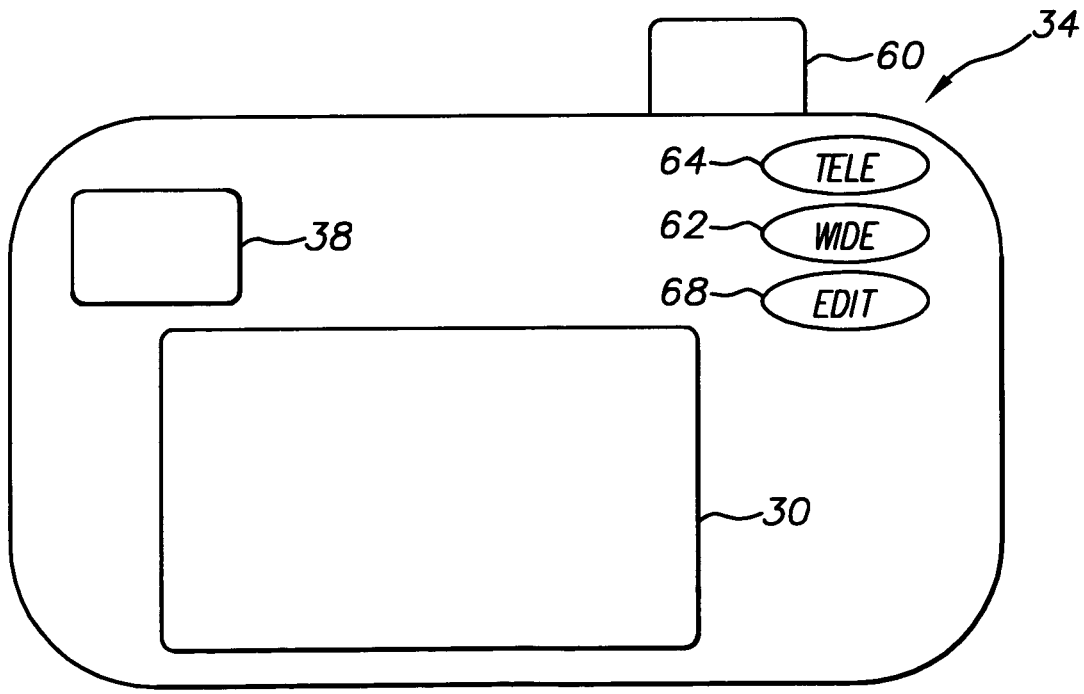
FIG. 10 shows another embodiment of a display device.
Figure 11:
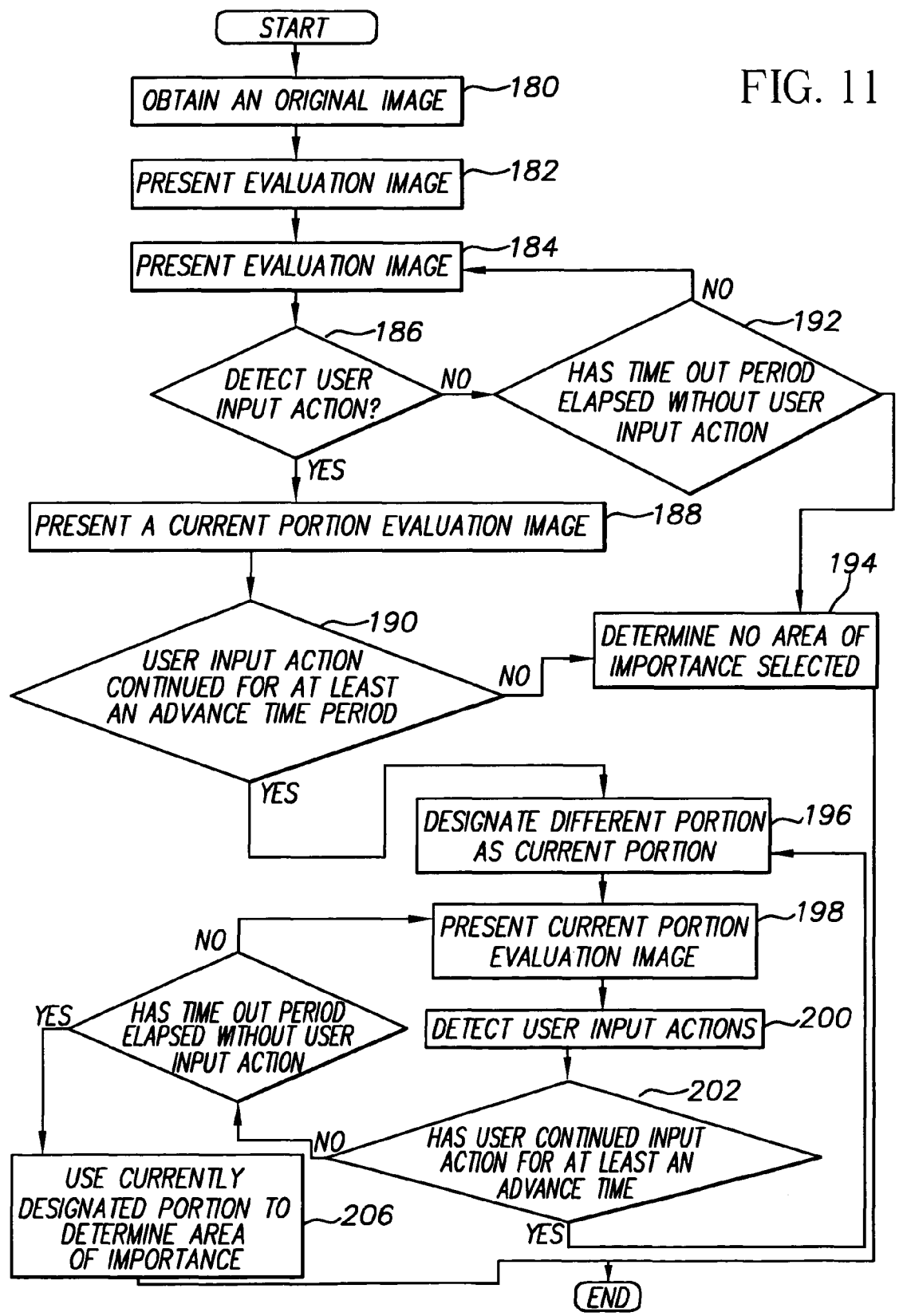
FIG. 11 shows a flow diagram of another embodiment of a method for determining an area of importance.

FIGS. 10 and 11 show another embodiment of a display device 10 and method of the present invention. In embodiment of FIGS. 10 and 11, the user designation can be performed using only one input of a user input system 34 designated, in this embodiment, as edit button 68 which is used to designate a portion of the original image. As is shown in the embodiment of FIG. 11, after an original image has been obtained (step 182) an evaluation image based upon the obtained original image is presented (step 184) using for example display 30.

Controller 32 monitors user input system 34 to detect whether a user of display device 10 makes a user input action during presentation of the evaluation image. Where controller 32 detects that a user makes the user input action of depressing edit button 68 of display device 10 during presentation of the evaluation image (step 186), controller 32 will cause a first current portion evaluation image to be presented on display 30 (step 188). The first current portion evaluation image can be a portion evaluation image based upon any of the pre-defined portions. In one embodiment the current portion evaluation image comprises a portion evaluation image that is concentric with the original image, and therefore has the appearance of a zoomed image. However, this is not necessary and the initial portion evaluation image can comprise any portion of the original image.

If the user does not make a user input action within the timeout period (step 192), controller 32 can determine from this that the user does not wish to designate any portion of the original image as an area of importance (step 194). Alternatively, controller 32 can interpret the absence of a user input action within the timeout period (not shown) to mean that the user selects the entire original image as an area of importance.

If controller 32 detects that a user input action that continues after an advance time period, (e.g. where edit button 68 is still depressed after 3 seconds) (step 190), controller 32 will designate a different portion from the set of predetermined portions of as a current portion of the original image (step 196) and will cause a portion evaluation image to be presented on display 30 using the currently designated portion (step 198).

Controller 32 is adapted to detect whether a user input action is performed during presentation of the current portion evaluation image (step 200). Where a user input action is detected during presentation of the current portion evaluation image, controller 32 determines whether the user continues the input action for at least an advance time (step 202). For example, controller 32 can detect whether user interaction is sustained for an advance time period of, for example, three seconds. Where this condition is detected, controller 32 causes a different portion of the original image to be selected from the set of portions of the original image for use as the current portion (step 196). A portion evaluation image is then presented (step 198) and the process of detecting whether a user input action is performed during presentation of the new current portion evaluation image (step 200) is performed.

When controller 32 determines that the user has not made a user input action during a timeout period during which the of the current evaluation portion evaluation image is presented, controller 32 then proceeds to the step of determining an area importance image in the original image based upon the currently designated portion (step 206). Optionally, the area of importance can be used by controller 32, for example, for the purposes of cropping and/or resizing the original image (not shown). Also optionally, controller 32 can record information in association with the original image indicating the area of importance so that later editing processes can the area of importance to generate a cropped image (step also not shown).

It will be appreciated that, using a method of the embodiment of FIG. 11, a display device 10 is provided that uses a one button control method for designating an area importance in an original image yet allows the user of the display device 10 to select from among portions of the original image that are not central to the original image. Such a one button embodiment has particular usefulness in display devices such as digital cameras, digital image and video players, and cellular telephones and provides a convenient and quick means for designating the area importance in an image without requiring precise alignment of borders of the area importance. Further, this embodiment does not require a user input action that is directional in that there is no inherent or apparent correlation between the direction of movement of the user input controls and the location of the designated portion.

Figure 12:
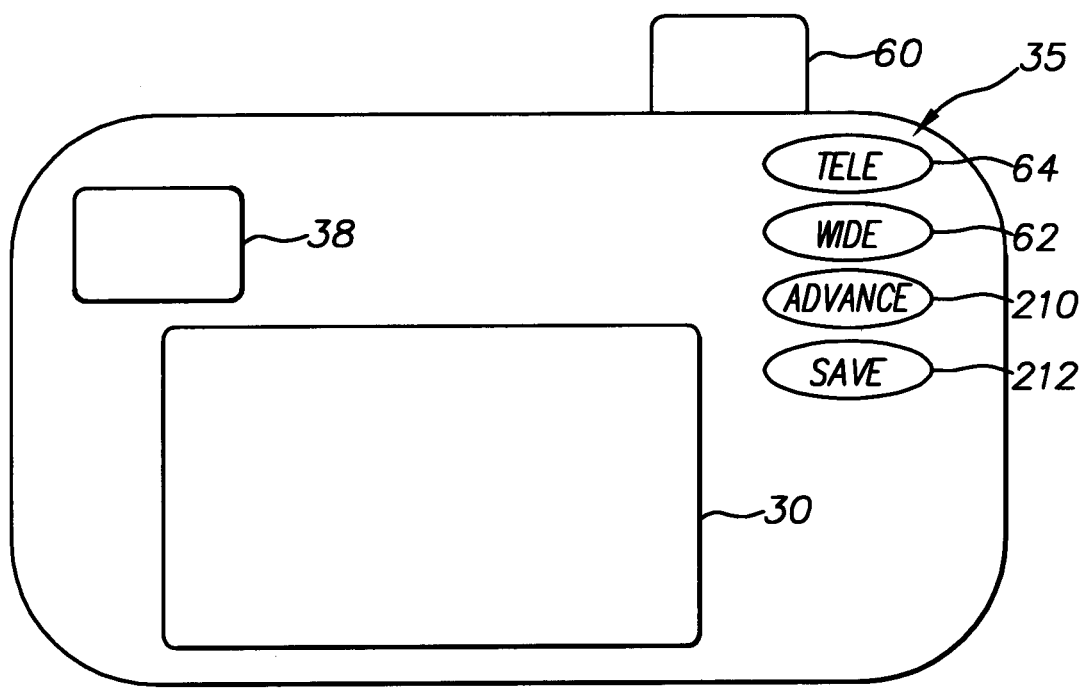
FIG. 12 shows another embodiment of a display device.
Figure 13:
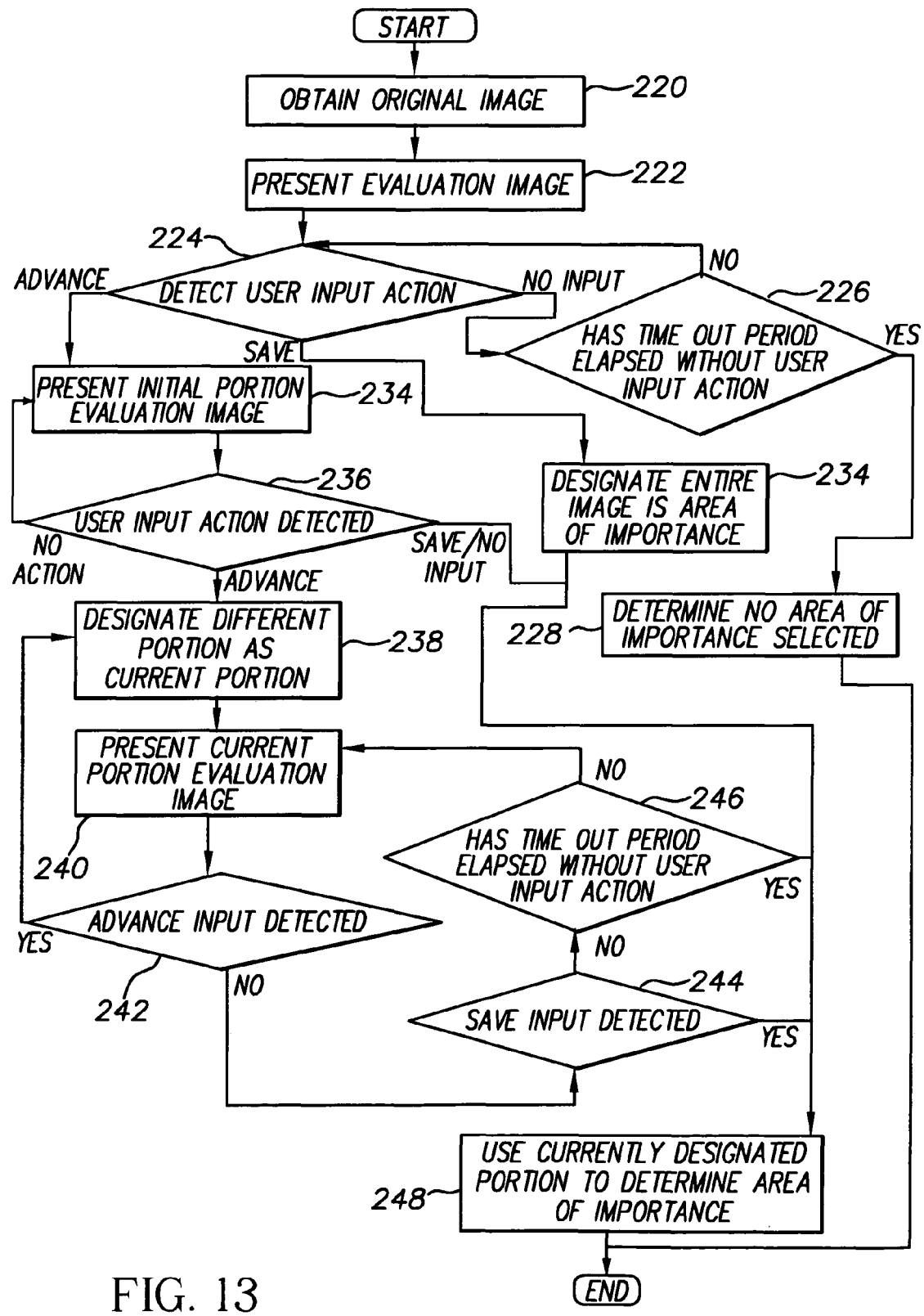
FIG. 13 shows another embodiment of a method for determining an area of importance.

FIG. 12 shows another embodiment of a display device 10 of the invention. In the embodiment shown in FIG. 12, display device 10 provides a user input system 34 having two buttons that are used to make an area of importance designation: an advance button 210 and a save button 212. FIG. 13 shows one embodiment of the method for determining an area of importance in original image using the user input system 34 shown in FIG. 12. As a shown in the embodiment of FIG. 13, and original images obtained (step 220) and an initial evaluation image is presented (step 222).

Controller 32 monitors user input 34 during presentation of the initial evaluation image to detect whether the user display device 10 makes a user input action during presentation of the user input action (step 224). In this embodiment, controller 34 is adapted to detect two user input actions, an advance user input action and a save user input action during a timeout (e.g. ten seconds) at least part of which corresponds to a time during which the initial evaluation image is presented (step 222). The advance user input action is used by a user of display device 10 to request presentation of an evaluation image that is based upon a portion of the original image that is other than the currently presented portion. In the embodiment shown in FIGS. 12 and 13, the advance user input action comprises depressing advance button 210. The save user input action is used to designate a currently presented portion. In the embodiment shown in FIGS. 11 and 12, the save user input action comprises actuation of the save button 212. It will be appreciated that where other forms of user input systems 34 are used, other inputs can be provided and used for the purpose of receiving advance user input action and a save user input action, some of which will be described in greater detail below.

In the embodiment shown in FIG. 13, three options are available to a user of display device 10 during presentation of the evaluation image. A first option occurs when the user of display device 10 makes an advance user input action, controller 32 can proceed with the steps of presenting an portion evaluation images and possibly receiving a user selection (step 232-step 246) as will be as described in greater detail below. In a second option, the user can affirmatively designate the evaluation image that is based upon the entire original image in which case, the entire original image can be determined as an area importance (step 234). In a third option, the user can take no action within the timeout period (step 226) and, where this occurs, controller 32 can determine that no area of importance has been selected for the original image (step 228). Alternatively, where the user fails to take any action within the timeout period, a controller 32 can determine that the entire original image is an area importance.

When advance user input action is detected during the timeout period, controller 32 will cause an initial portion evaluation image to be presented on display 30 (step 234). The initial portion evaluation image can be a portion evaluation image that is based upon any of the predefined portions. In one embodiment, the initial portion evaluation image can comprise a portion evaluation image that is concentric with the original image, and, therefore, has the appearance of a conventionally zoomed image. However, this is not necessary.

During presentation of the initial portion evaluation image, controller 32 monitors user input 34 to determine whether the user of display device 10 makes a user input action by actuating either the advance button 210 or the save button 212 (step 236). Where the advance button 210 is actuated during presentation of the initial portion evaluation image, controller 32 can designate a different one of the portions from the set of predetermined portions as a current portion of the original image (step 238) and will cause a portion evaluation image that is based upon the currently designated portion to be presented on display 30 (step 240) so that the user of display device 10 can evaluate the currently designated portion. When save button 212 is actuated during presentation of the initial portion evaluation image (step 236), controller 32 will use the currently designated portion, in this case, the initial portion, to determine an area importance in the original image (step 248). Where no user input action is received, controller 32 can continue presentation of the current portion evaluation image for a timeout period. At the conclusion of the timeout period (step 246), controller 32 can optionally determine that no area of importance has been selected for the original image (step 228), can determine that the entire original image comprises an area of importance, or as shown, can determine that the portion of the image corresponding to the portion used to form the initial portion evaluation image is the area of importance, or can take such other action as may be dictated by a user preference or a manufacturer preference.

During presentation of each portion evaluation image, controller 32 monitors user input system 34 to determine whether the user of display device 10 actuates either of the advance button 210 (step 242) or the save button 212 (step 244). Where the advance button 210 is actuated during presentation of the initial portion evaluation image, controller 32 can designate a different one of the portions from the set of predetermined portions as a current portion of the original image (step 238) and will cause a portion evaluation image to be presented on display 30 (step 240) so that the user of display device 10 can evaluate this portion evaluation image. Where the save button 212 is actuated during presentation of the initial portion evaluation image, controller 32 will use the currently designated portion, to determine an area of importance in the original image (step 248). At the conclusion of the timeout period (step 246), controller 32 can determine that the entire original image comprises an area of importance, controller 32 can determine that no area of importance has been selected for the original image (step 228), or can take such other or as shown, controller 32 can determine that the portion of the image corresponding to the portion used to form the initial portion evaluation image is the area of importance (step 244), depending a user preference or a manufacturer preference.

In one alternative embodiment of the method of FIG. 11, controller 32 can be adapted to detect an advance user input and to begin presenting a sequence of portion evaluation images each portion evaluation image based upon one of a set of different portions of the original image. If the user makes a save input action during presentation of one of the portion evaluation images, the controller 32 will consider the user to have designated the currently presented portion of the original image for use in determining an area importance. If the user does not make a save input action during presentation of the portion evaluation images, controller 32 can determine that the entire image is an area of importance, or can determine that the user does not wish to make such a designation of an area importance.

It will be appreciated that of the method shown in FIG. 13 can be performed using a variety of embodiments of display device 10 including any embodiment wherein the user interface input system 34 comprises at least two controls. For example, in a conventional camera embodiment of display device 10, the advance input can comprise the tele-photo zoom button 64 and the save button can comprise a shutter trigger button 60. Similarly, in an embodiment where display device 10 comprises a cellular phone or other device having a keypad, any combination of two keys can be used for this purpose.

In still another embodiment, the method of FIG. 11 can be practiced using a single user input control with a depression of the control acting as a advance user input and the release of the control acting as a save user input. In this way, an area can be designated using only a single touch of the user control.

Figure 14:
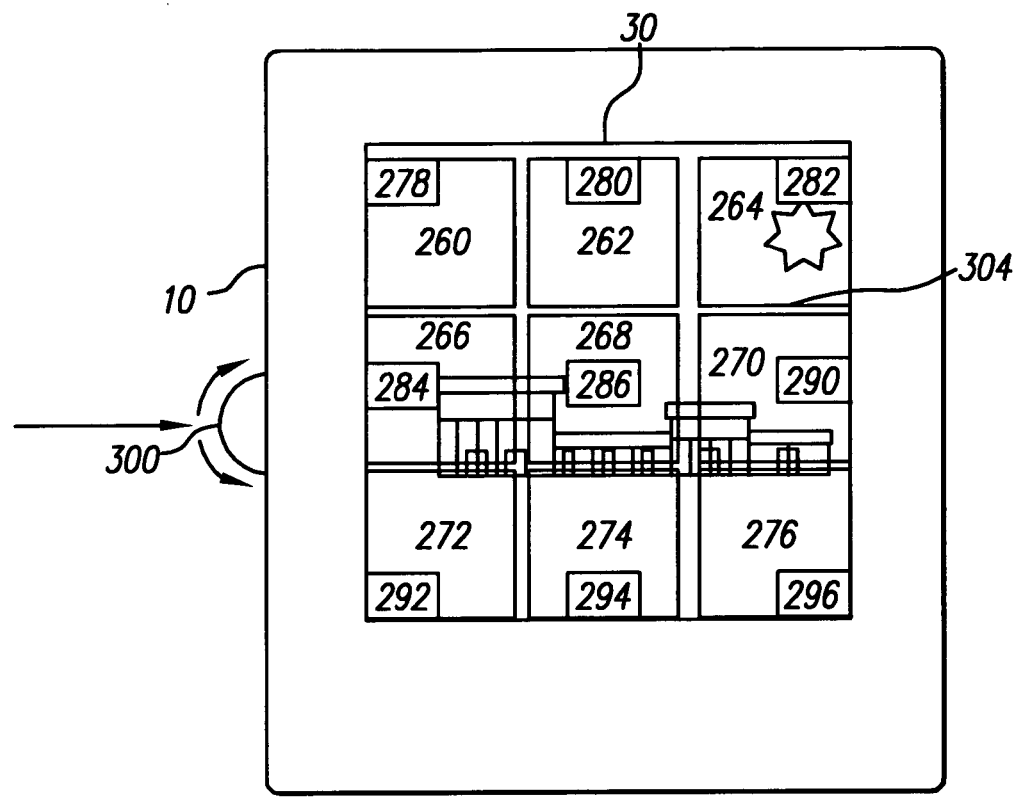
FIG. 14 shows another embodiment of a display device showing an original image with anchor points.
Figure 15:
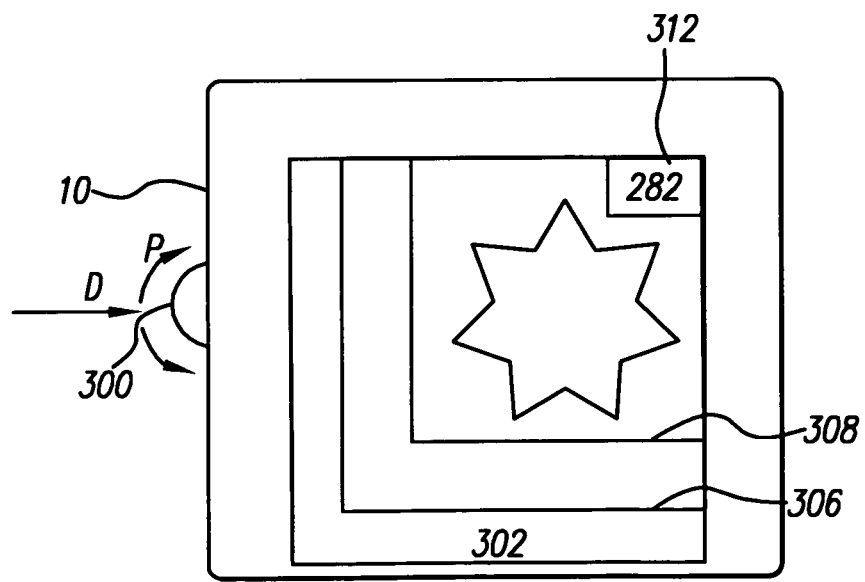
FIG. 15 shows another embodiment of a display device showing a portion evaluation image with optional differently sized portion shapes.

In yet another embodiment, shown in FIGS. 14 and 15, display device 10 is shown comprising a personal digital assistant that incorporates a jog dial 300. Jog dial 300 is operable in at least one rotation direction (R) and one depression direction (D). In this embodiment jog dial 300 generates a rotation signal when jog dial 300 is rotated and a depression signal when jog dial 300 is moved in the depression direction. Controller 32 interprets the rotation signal as advance user input and controller 32 interprets the depression signal as a save user input.

In the embodiments described above, the designated portion has been described in a manner that suggests that the shape of the designated portion is static with each portion defining and predefined area of the original image. This is not necessarily so. In the above described embodiments of the invention, a user of display device 10 can be permitted to designate the position and other characteristics of a designated portion. FIGS. 14 and 15 illustrate one way in which this may be done.

FIG. 14 shows a display device 10 presenting an evaluation image containing image information from the original image. As is shown in FIG. 14, a set of portions (260-276) are provided in the original image. Each portion (260-276) is located in the original image relative to a predefined anchor point (278-296). If jog dial 300 is rotated during presentation of the evaluation image, controller 32 will interpret this as an advance user input action and can determine that is necessary to present at least one portion evaluation image. The portion evaluation image can be associated with for example, portion 264. Accordingly, controller 32 causes the preparation and presentation of an initial evaluation image 302 shown in FIG. 15.

In preparing initial evaluation image 302, controller 32 defines a portion shape 304 within the original image and locates the portion shape 304 within the original image relative to anchor point 282. In this embodiment, controller 32 is further adapted to receive a shape designating input from user input system 34. The shape designating input can comprise, for example, magnification input that defines the size of the portion shape that is to be located relative to the anchor point. For example, as is shown in FIG. 15, after a user designates a portion 264 having anchor point 282, display device 10 presents the initial evaluation image 302. If during presentation of the evaluation image 302, jog dial 300 is depressed, controller 32 can determine that the user wishes to select designate the portion of the original image that corresponds to the portion shown in evaluation image 302 and can proceed as described above. If during presentation of the initial evaluation image 302, jog dial 300 is rotated, controller 32 can define a new portion shape 306 or 308 relative to anchor point 290, and can cause the formation of a current evaluation image containing only image information that is within portion shape 306 or portion shape 308 as selected by the user when the user depresses jog dial 300. New portion shapes 306 or 308 are located with respect to anchor point 282 and other characteristics of the portions can be determined such as aspect ratio or overall form or pattern in like fashion.

Accordingly, what is provided, is a display device 10 that can be used to designate portions of the original image as areas of importance without requiring directional inputs and positioning of elements. Controller 32 can be adapted to use this designation for variety of purposes including but not limited to generating metadata indicating the user's designation of an area importance can associating this metadata with the original image. In the case of a digital capture, the controller 32 can associate such area importance metadata with the image by storing the metadata in the captured digital image or by storing data that associates the digital image with a storage location containing the metadata area importance metadata so that the metadata can be retrieved later. Where the original image is captured for example on a photosensitive medium such as a photosensitive filmstrip, the metadata can be recorded on a photosensitive filmstrip optically recorded or magnetically recorded on a photographic conscript using techniques known in the art. The area of importance data can also be used to crop the original image, to form thumbnail images for the original image, to adjust compression settings for storing the original image, or for variety of other uses.

The invention has been described in detail with particular reference to certain preferred embodiments thereof, but it will be understood that variations and modifications can be effected within the spirit and scope of the invention.

PARTS LIST 10 display device
12 digital camera
20 body
22 image capture system
23 lens system
24 image sensor 25 lens driver
26 signal processor
27 rangefinder
28 display driver
30 display
32 controller
34 user input system
36 sensors
38 viewfinder system
40 memory
48 removable memory
50 memory interface
52 remote memory system
54 communication module
60 trigger button
62 wide angle zoom button
64 telephoto zoom button
68 edit button
100 obtain original image step
102 present evaluation image step
104 detect user input action step
106 designate portion step
108 present portion evaluation image step
110 detect a user reset action step
112 determine area importance in original image
114 use determined area importance
120 original image
122 portion
124 portion
126 portion
128 portion
130 portion
132 portion
134 portion
136 portion
138 portion
140 portion
142 portion
144 portion
146 portion
148 portion
150 portion
160 portion evaluation image
162 portion evaluation Image
164 portion evaluation image
166 mask
168 separator
170 area of the importance
180 obtain original image step
182 present evaluation image
184 present evaluation image step
186 detect user input action step
188 present initial portion evaluation image
190 determine whether user input action has continued for at least an advance time period step
192 determine whether time out period has elapsed without user input action step
194 determine no area of importance selected step
196 designate different portion as current portion step
198 present current portion evaluation image step
200 determine whether time out period has elapsed without user input action step
202 determine whether user input action has continued for at least an advance time period step
204 determine whether time out period has elapsed without user input action step
206 use currently designated portion to determine area of importance step
210 advance button
212 save button
220 obtain original image step
222 present initial evaluation image step
224 detect user input action step
226 determine whether time out period has elapsed without user input action step
228 determine no area of importance selected step
234 present initial portion evaluation image step
236 detect user input action step
238 designate different portion as current portion step
240 present current portion evaluation image step
242 detect advance user input step
244 detect save user input step
246 determine whether time out period has elapsed without user input action step
260 portion
262 portion
264 portion
266 portion
268 portion
270 portion
272 portion
274 portion
276 portion
278 anchor point
280 anchor point
282 anchor point
284 anchor point
286 anchor point
288 anchor point
290 anchor point
292 anchor point
294 anchor point
296 anchor point
300 jog dial
302 initial evaluation image
306 new portion shape
308 new portion shape

The invention claimed is:

1. A display device comprising:
a source of an original image;
a display;
a user input system adapted to generate a signal in response to a user input action, wherein the user input action is not directional in that there is no apparent correlation between a direction of movement of user input controls and a location of a designated portion of the original image; and
a controller adapted to determine a set of portions of the original image, the set of portions determined based at least on a frequency analysis of the original image to identify areas of the original image that are in focus and the set of portions defined corresponding to each of the identified in focus areas in the image, the set of portions including at least one portion having less than all of another portion, each portion including less than all of the original image and with the set having at least one portion that is non-central with respect to the original image and to successively designate a different one of a set of portions of the original image in response to the signal and adapted to cause the display to present a portion evaluation image showing the currently designated portion of the original image and to determine an area of importance in the original image based upon the currently designated portion;
wherein each portion evaluation image shows the currently designated portion having a magnification, that is greater than the magnification that the currently designated portion has when the currently designated portion is presented as a part of the original image.

2. The display device of claim 1, wherein the controller is further adapted to generate area of importance data defining the portion of the original image determined to be the area of importance based upon the determined area of importance and to associate the area of importance data with the original image so that a person having access to the original image can also determine which area of the image was determined to be the area of importance.

3. The display device of claim 2, wherein the controller associates the area of importance data with the original image by storing the area of importance data as metadata in a digital image that comprises the original image.

4. The display device of claim 2, wherein the controller associates the area of importance data with the original image by storing the area of importance data as metadata on a photosensitive film bearing the original image.

5. The display device of claim 1, wherein the controller is further adapted to generate a revised image based upon image information from the area of importance and to store the revised image.

6. The display device of claim 5, wherein the controller is further adapted to resample the revised image so that the revised image has image characteristics that correspond to the image characteristics of the original image.

7. The display device of claim 1, wherein the user input system generates a save input in response to a save user input action and, in response thereto, the controller uses the currently designated portion to determine an area of importance.

8. The display device of claim 1, wherein the user input system generates a reset signal in response to a reset user input action and the controller does not designate an area of importance for an image when a reset action is detected.

9. The display device of claim 1, wherein the set of predetermined portions of the original image include less than 10 portions.

10. The display device of claim 1, wherein the user input system is adapted to receive a magnification input and to generate a magnification signal in response thereto and wherein the controller is adapted to use more than one set of portions of image information from the original image with each set having at least one portion therein that is sized differently from at least one portion in another set of the more than one set of portions, and with the controller selecting one of the more than one set based upon the magnification input.

11. A method comprising:
generating, using a processor, a signal in response to an input action;
determining, using the processor, a set of portions of an original image by identifying areas of the original image that are in focus, wherein each portion in the set includes less than all of the original image and the set includes at least one portion that is non-central with respect to the original image;
designating, using the processor, one of the set of portions of the original image in response to the generated signal;
presenting on a display a portion evaluation image showing the designated one of the set of portions of the original image; and
determining, using the processor, an area of importance in the original image based on the designated one of the set of portions.

12. The method of claim 11, wherein the areas of the original image are identified as in focus by performing a frequency analysis of the original image.

13. The method of claim 11, further comprising successively designating a different one of the set of portions of the original image.

14. The method of claim 13, wherein the area of importance is based on a last designated portion.

15. The method of claim 11, wherein the portion evaluation image shows the currently designated portion having a magnification that is greater than the magnification that the currently designated portion has when the currently designated portion is presented as a part of the original image.

16. The method of claim 11, further comprising generating, using the processor, a revised image based on image information from the area of importance.

17. The method of claim 11, further comprising storing, in a memory, area of importance data with the original image by storing metadata in the original image.

18. An apparatus comprising:
a source configured to provide an original image;
an input system configured to generate a signal in response to an input action; and
a controller configured to determine a set of portions of the original image by identifying areas of the original image that are in focus, wherein each portion in the set includes less than all of the original image and the set includes at least one portion that is non-central with respect to the original image, wherein the controller is further configured to designate one of the set of portions of the original image in response to the generated signal and determine an area of importance in the original image based on the designated one of the set of portions; and
a display configured to present a portion evaluation image showing the designated one of the set of portions of the original image.

19. The apparatus of claim 18, wherein the input action is not directional in that there is no apparent correlation between a direction of movement of input controls and a location of a designated portion of the original image.

20. The apparatus of claim 18, wherein the areas of the original image are identified as in focus based on a frequency analysis of the original image.

21. The apparatus of claim 18, wherein the controller is configured to successively designate a different one of the set of portions of the original image.

22. The apparatus of claim 21, wherein the area of importance is based on a last designated portion.

23. The apparatus of claim 18, wherein the portion evaluation image shows the currently designated portion having a magnification that is greater than the magnification that the currently designated portion has when the currently designated portion is presented as a part of the original image.

24. The apparatus of claim 18, further comprising a storage configured to store a revised image generated based on image information from the area of importance.

25. The apparatus of claim 24, wherein the storage is configured to store area of importance data with the original image by storing metadata in the original image.

26. A non-transitory computer readable medium having instructions stored thereon, the instructions comprising:
instructions for generating a signal in response to an input action;

instructions for determining a set of portions of an original image by identifying areas of the original image that are in focus, wherein each portion in the set includes less than all of the original image and the set includes at least one portion that is non-central with respect to the original image;

instructions for designating one of the set of portions of the original image in response to the generated signal;

instructions for presenting a portion evaluation image showing the designated one of the set of portions of the original image; and instructions for determining an area of importance in the original image based on the designated one of the set of portions.

27. The computer readable medium of claim 26, further comprising instructions for successively designating a different one of the set of portions of the original image.

28. The computer readable medium of claim 27, wherein the area of importance is based on a last designated portion.

29. The computer readable medium of claim 26, wherein the portion evaluation image shows the currently designated portion having a magnification that is greater than the magnification that the currently designated portion has when the currently designated portion is presented as a part of the original image.

30. The computer readable medium of claim 26, further comprising instructions for generating a revised image based on image information from the area of importance.

* * * * *

UNITED STATES PATENT AND TRADEMARK OFFICE
CERTIFICATE OF CORRECTION

| | | |
|---|---|---|
| PATENT NO. | : 8,659,619 B2 | Page 1 of 1 |
| APPLICATION NO. | : 10/810283 | |
| DATED | : February 25, 2014 | |
| INVENTOR(S) | : Cannon et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 560 days.

Signed and Sealed this
Twenty-ninth Day of September, 2015

Michelle K. Lee
*Director of the United States Patent and Trademark Office*